United States Patent
del Rosario

(10) Patent No.: US 10,674,033 B2
(45) Date of Patent: Jun. 2, 2020

(54) INFORMATION ACQUISITION METHOD, COMMUNICATION SYSTEM, AND NON-TRANSITORY COMPUTER-READABLE MEDIUM

(71) Applicant: Oki Data Corporation, Tokyo (JP)

(72) Inventor: Rowel del Rosario, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 16/166,740

(22) Filed: Oct. 22, 2018

(65) Prior Publication Data

US 2019/0132474 A1    May 2, 2019

(30) Foreign Application Priority Data

Oct. 30, 2017  (JP) ................. 2017-208736

(51) Int. Cl.
  *H04N 1/32*  (2006.01)
  *H04N 1/00*  (2006.01)
(52) U.S. Cl.
  CPC ..... *H04N 1/32096* (2013.01); *H04N 1/00244* (2013.01); *H04N 1/00307* (2013.01); *H04N 1/00408* (2013.01); *H04N 1/3209* (2013.01); *H04N 2201/006* (2013.01); *H04N 2201/0055* (2013.01); *H04N 2201/0094* (2013.01)

(58) Field of Classification Search
None
See application file for complete search history.

(56) References Cited

U.S. PATENT DOCUMENTS

| 2015/0062632 A1* | 3/2015 | Torii | G06F 3/126 358/1.15 |
| 2015/0215446 A1* | 7/2015 | Fujimoto | G06F 3/0412 455/566 |
| 2016/0301824 A1* | 10/2016 | Shibao | H04N 1/32112 |

FOREIGN PATENT DOCUMENTS

JP    11-205516 A    7/1999

* cited by examiner

*Primary Examiner* — Frantz Bataille
(74) *Attorney, Agent, or Firm* — Panitch Schwarze Belisario & Nadel LLP

(57) ABSTRACT

An information acquisition method includes steps of selecting, transmitting, and determining. The selecting step is a step of selecting one function demanding an input of a destination. The transmitting step is a step of transmitting information indicating one or more destinations from a mobile terminal to a multifunction device. The determining step is a step of determining at least one destination corresponding to the one function.

14 Claims, 15 Drawing Sheets

| NAME | PHONE NUMBER | EMAIL ADDRESS | FACSIMILE NUMBER | |
|---|---|---|---|---|
| User0001 | 0120-000-0001 | u0001@mail.com | 11-1111-1111 | 182a |
| User0002 | 0120-000-0002 | UNREGISTERED | 22-2222-2222 | 182b |
| User0003 | 0120-000-0003 | u0003@mail.com | UNREGISTERED | 182c |
| User0004 | 0120-000-0004 | UNREGISTERED | UNREGISTERED | 182d |

| NAME | PHONE NUMBER | EMAIL ADDRESS |
|---|---|---|
| User0001 | 0120-000-0001 | u0001@mail.com |
| User0003 | 0120-000-0003 | u0003@mail.com |

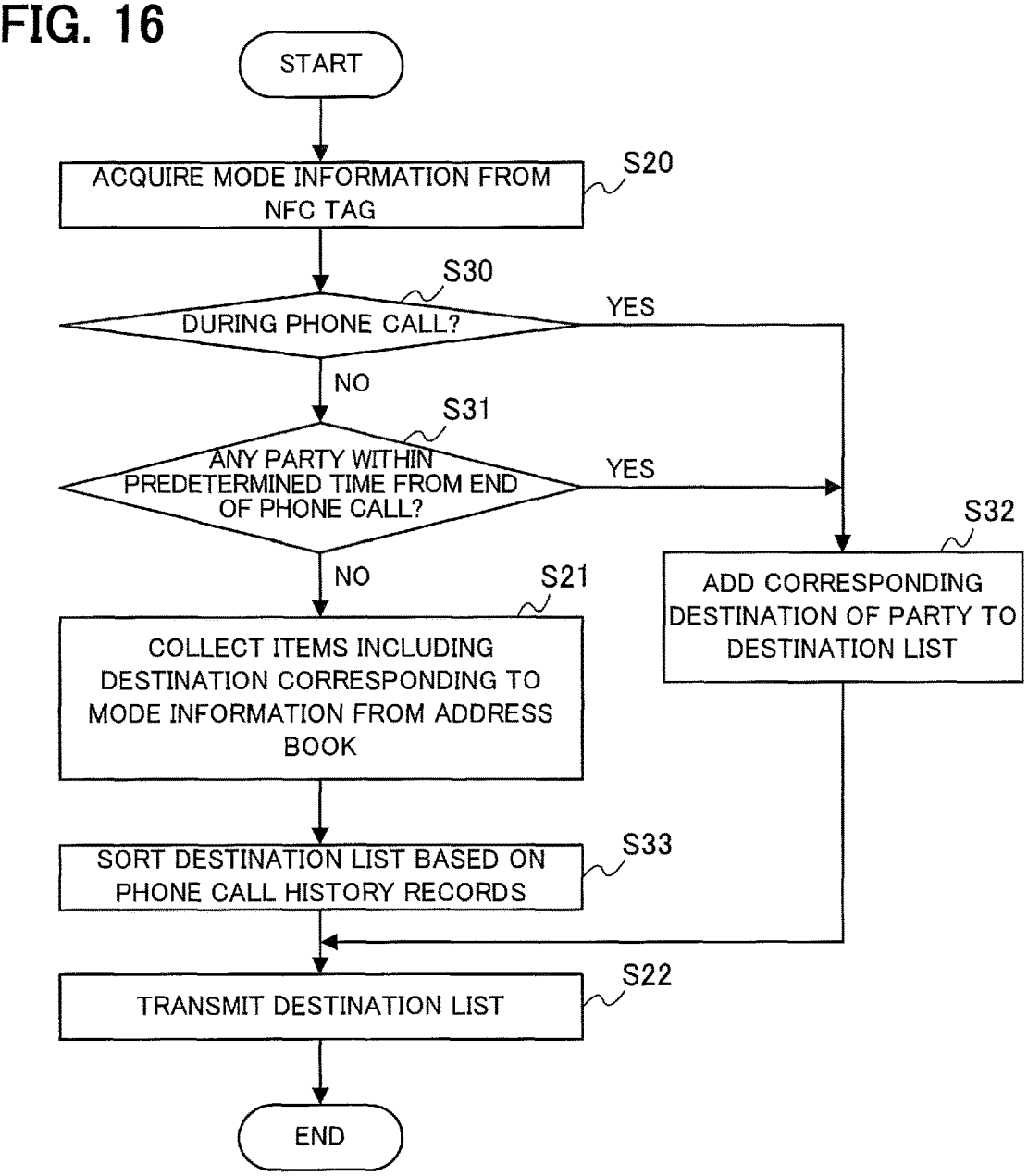

| NAME | PHONE NUMBER | EMAIL ADDRESS |
|---|---|---|
| User0003 | 0120-000-0003 | u0003@mail.com |
| User0001 | 0120-000-0001 | u0001@mail.com |

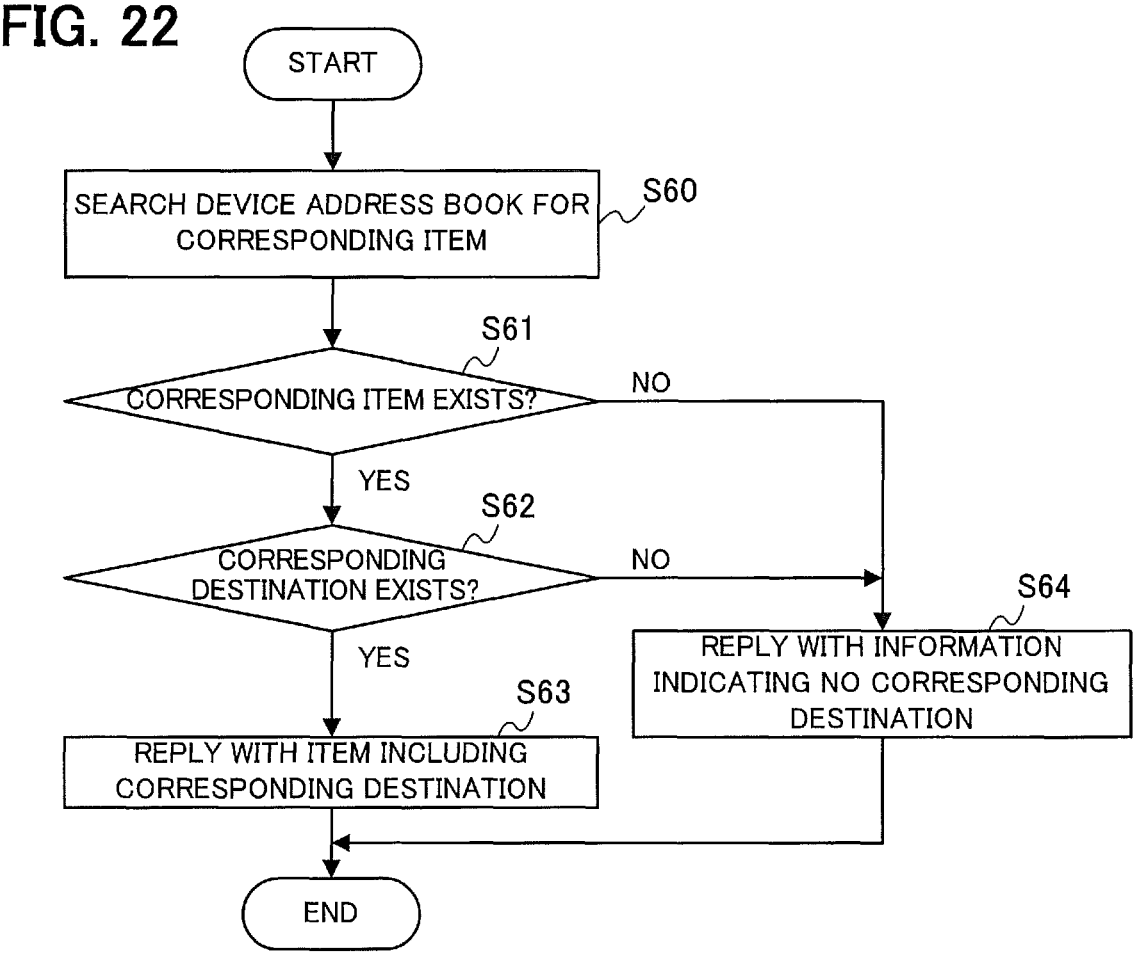

| NAME | PHONE NUMBER | EMAIL ADDRESS | |
|---|---|---|---|
| User0003 | 0120-000-0003 | u0003@mail.com | 383a |
| User0002 | 0120-000-0002 | UNREGISTERED | |
| User0001 | 0120-000-0001 | u0001@mail.com | 383b |
| User0004 | 0120-000-0004 | UNREGISTERED | 383c |
| UNREGISTERED | 0120-111-1234 | UNREGISTERED | |

| NAME | PHONE NUMBER | EMAIL ADDRESS | FACSIMILE NUMBER | |
|---|---|---|---|---|
| User1234 | 0120-111-1234 | u1234@mail.com | 11-1111-1234 | 385a |
| User0002 | 0120-000-0002 | u0002@mail.com | 22-2222-2222 | 385b |

| NAME | PHONE NUMBER | EMAIL ADDRESS |
|---|---|---|
| User0003 | 0120-000-0003 | u0003@mail.com |
| User0002 | 0120-000-0002 | u0002@mail.com |
| User0001 | 0120-000-0001 | u0001@mail.com |
| User1234 | 0120-111-1234 | u1234@mail.com |

# INFORMATION ACQUISITION METHOD, COMMUNICATION SYSTEM, AND NON-TRANSITORY COMPUTER-READABLE MEDIUM

CROSS-REFERENCE TO RELATED APPLICATION

This application claims priority under 35 U.S.C. § 119(b) to Japanese Application No. 2017-208736, filed Oct. 30, 2017, the disclosure of which is incorporated by reference herein in its entirety.

BACKGROUND OF THE INVENTION

1. Field of the Invention

The present invention relates to an information acquisition method, a communication system and a non-transitory computer-readable medium

2. Description of the Related Art

Conventionally, in cases where a function, such as facsimile transmission or mail transmission, demanding an input of a destination is used on a multifunction device, it is necessary to previously register the destination in the multifunction device or to input the destination each time.

An MFP (Multi-Function Printer) disclosed by Miyoshi in Japanese Patent Application Publication No. H11-205516 is capable of reading in facsimile numbers registered in a PDA (Personal Digital Assistant).

Inputting a destination manually takes a lot of trouble of operation and has a high probability of an inputting error.

In the conventional technology, the user has to connect the PDA to the MFP via SCSI (Small Computer System interface) and activate an address book function in the PDA while also activating an address book generation function in the MFP. Thus, the user has to perform a lot of operations and the load on the user is heavy. Further, the conventional technology, reading in facsimile numbers, does not handle other kinds of destinations such as mail addresses.

It is therefore an object of one or more aspects the present invention to make it possible to acquire a necessary destination from a mobile terminal with ease.

SUMMARY OF THE INVENTION

An information acquisition method according to a first aspect of the present invention is an information acquisition method by which a multifunction device acquires information from a mobile terminal in a communication system. The communication system includes the multifunction device and the mobile terminal capable of connecting to the multifunction device. The mobile terminal includes a terminal address book including a plurality of items. The mobile terminal being able to register a plurality of destinations for each opposite party of communication by use of the mobile terminal to each of the plurality of items. The information acquisition method includes a step of selecting, a step of transmitting, and a step of determining. The selecting step is a step of selecting one function demanding an input of a destination from a plurality of functions which the multifunction device is capable of executing. The transmitting step is a step of transmitting the information from the mobile terminal to the multifunction device. The information indicates one or more destinations which is included in the plurality of destinations. The determining step is a step of determining at least one destination corresponding to the one function between the step of selecting and the step of transmitting or after the step of transmitting.

An information acquisition method according to a second aspect of the present invention is an information acquisition method by which a multifunction device acquires information from a mobile terminal in a communication system. The communication system includes the multifunction device and the mobile terminal capable of connecting to the multifunction device. The mobile terminal includes a terminal address book including a plurality of items. The mobile terminal is able to register identification information and a plurality of destinations for each opposite party of communication by use of the mobile terminal to each of the plurality of items. The multifunction device includes a device address book including a plurality of records. The multifunction device is able to register identification information and a plurality of destinations for each opposite party of communication by use of the multifunction device to each of the plurality of records. The information acquisition method includes a step of selecting, a step of transmitting, a step of extracting, and a step of adding. The transmitting step is a step of selecting one function demanding an input of a destination from a plurality of functions which the multifunction device is capable of executing. The transmitting step is a step of transmitting a destination list as the information from the mobile terminal to the multifunction device. The destination list includes at least one list item which includes identification information registered in an item corresponding to an opposite party in the middle of a phone call among the plurality of items. The extracting step is a step of the multifunction device extracting a destination corresponding to the one function from a record corresponding to the at least one list item among the plurality of records included in the device address book. The adding step is a step of the multifunction device adding the extracted destination to the at least one list item.

An information acquisition method according to a third aspect of the present invention is an information acquisition method by which a multifunction device acquires information from a mobile terminal in a communication system. The communication system includes the multifunction device and the mobile terminal capable of connecting to the multifunction device. The mobile terminal includes a terminal address book including a plurality of items and history information indicating at least one opposite party of a phone call made by using the mobile terminal. The mobile terminal is able to register identification information and a plurality of destinations for each opposite party of communication by use of the mobile terminal to each of the plurality of items. The multifunction device includes a device address book including a plurality of records. The multifunction device is able to register identification information and a plurality of destinations for each opposite party of communication by use of the multifunction device to each of the plurality of records. The information acquisition method includes a step of selecting, a step of transmitting, a step of extracting, and a step of adding. The selecting step is a step of selecting one function demanding an input of a destination from a plurality of functions which the multifunction device is capable of executing. The transmitting step is a step of transmitting a destination list as the information from the mobile terminal to the multifunction device. The destination list including at least one list item which includes identification information registered in an item corresponding to at least one opposite party included in the history information among the plurality of items. The extracting step is a step of the multifunction device extracting a destination corresponding to the one function from a record corresponding to the at least, one list item among the plurality of records included in the device address book. The adding step is a step of the multifunction device adding the extracted destination to the at least one list item.

A communication system according to an aspect of the present invention is a communication system including a multifunction device and a mobile terminal. The multifunction device includes an NFC tag, a device NFC unit, a device communication section, a device display section, a device input section, and a device control section. The NFC tag is compatible with the NFC (Near Field Communication) standard. The device NFC unit performs near field radio communication compatible with the NFC standard. The device communication section is used for connecting to a network. The device display section displays a first destination input screen image for inputting a transmission destination as a destination of transmitting image data in the network. The device input section receives an input of the transmission destination. The device control section stores application information in the NFC tag when the device display section displays the first destination input screen image, to make the mobile terminal activate a predetermined application. The mobile terminal includes a terminal storage section, a terminal NFC unit, and a terminal control section. The terminal storage section stores a terminal address book including a plurality of items. The mobile terminal is able to register a plurality of destinations for each opposite party of communication by use of the mobile terminal to each of the items. The terminal NFC unit performs near field radio communication compatible with the NFC standard. The terminal control section acquires the application information by the terminal NFC unit communicating with the NFC tag while the first destination input screen image is displayed on the device display section. The terminal control section activates the predetermined application according to the acquired application information. The terminal control section generates a destination list which includes at least one list item including at least one destination registered in at least one item among the plurality of items. The terminal control section makes the terminal NFC unit transmit the generated destination list to the device NFC unit. The device control section acquires the destination list via the device NFC unit. The device control section makes the device display section display a second destination input screen image on which the transmission destination can be inputted by selecting the at least one destination included in the destination list.

A non-transitory computer-readable medium according to an aspect of the present invention is a non-transitory computer-readable medium storing a program. The program causes a computer including a terminal NFC unit performing near field radio communication compatible with the NFC (Near Field Communication) standard to perform following steps. One of the steps is storing a terminal address book including a plurality of items. The computer is able to register a plurality of destinations for each opposite party of communication by use of the computer to each of the items. One of the steps is acquiring, via the terminal NFC unit from a multifunction device displaying a first destination input screen image for inputting a transmission destination as a destination of transmitting image data in a network, application information to making the computer activate a predetermined application. One of the steps is activating the predetermined application according to the acquired application information. One of the steps is generating a destination list including at least one list item. The at least one list item includes at least one destination registered in at least one item among the plurality of items. One of the steps is making the terminal NFC unit transmit the generated destination list to the multifunction device.

According to one or more aspects of the present invention, a necessary destination can be acquired from a mobile terminal with ease.

BRIEF DESCRIPTION OF THE DRAWINGS

FIG. 16 is a flowchart showing a process in the mobile terminal in the second embodiment.

FIG. 17 is a schematic diagram showing an example of history information in the second embodiment.

FIG. 22 is a flowchart showing an address book search process in the third embodiment.

FIG. 23 is a schematic diagram showing an example of history information in the third embodiment.

FIG. 24 is a schematic diagram showing a first example of a destination list in the third embodiment.

FIG. 25 is a schematic diagram showing an example of a device address book of the image forming device in the third embodiment.

FIG. 26 is a schematic diagram showing a second example of the destination list in the third embodiment.

DETAILED DESCRIPTION OF THE INVENTION

First Embodiment

Figure 1:
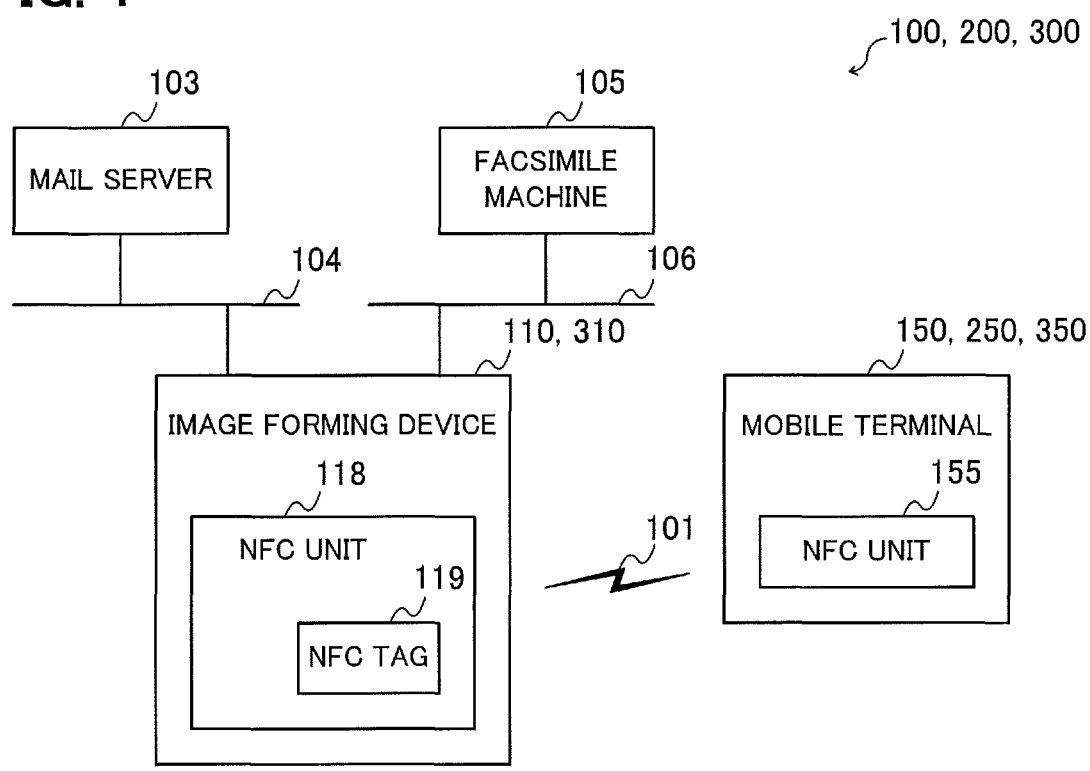
FIG. 1 is a block diagram schematically showing the configuration of an image forming system according to first to third embodiments.

FIG. 1 is a block diagram schematically showing the configuration of an image forming system 100 as a communication system according to a first embodiment.

The image forming system 100 includes an image forming device 110 as a multifunction device and a mobile terminal 150.

The image forming device 110 includes an NFC unit 118 compatible with the NFC (Near Field Communication) standard and having a near field communication function by radio. The NFC unit 118 includes an NFC tag 119 compatible with the NFC standard and providing information that has been set thereto. Incidentally, the NFC unit 118 is referred to also as a device NFC unit.

The mobile terminal 150 also includes an NFC unit 155 compatible with the NFC standard and having the near field communication function by radio.

When the user brings the mobile terminal 150 into proximity of the image forming device 110, the mobile terminal 150 is capable of acquiring information provided by the NFC tag 119 via radio 101. Further, the NFC unit 118 and the NFC unit 155 are capable of communicating via radio 101.

The image forming device 110 is connected to a first network 104 such as the Internet in order to communicate with a mail server 103, and is connected also to a second network 106 such as a public switched telephone network in order to communicate with a facsimile machine 105. When the image forming device 110 uses a mail transmission function, the image forming device 110 communicates with the mail server 103. When the image forming device 110 uses a facsimile transmission function, the image forming device 110 communicates with the facsimile machine 105. Incidentally, the first network 104 and the second network 106 can also be the same network.

Figure 2:
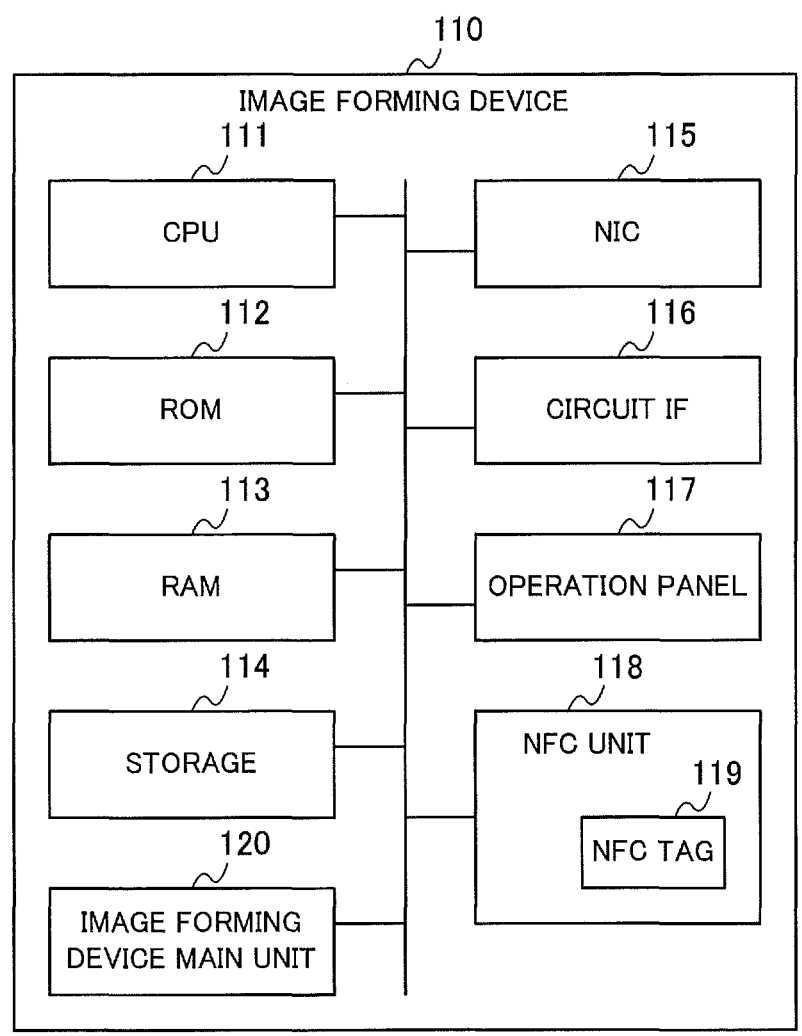
FIG. 2 is a block diagram schematically showing the hardware configuration of an image forming device in the first to third embodiments.

FIG. 2 is a block diagram schematically showing the hardware configuration of the image forming device 110 in the first embodiment.

The image forming device 110 includes a CPU (Central Processing Unit) 111, a ROM (Read Only Memory) 112, a RAM (Random Access Memory) 113, a storage 114, an NIC (Network Interface Card) 115, a circuit IF (Interface) 116, an operation panel 117, the NFC unit 118, the NFC tag 119 included in the NFC unit 118, and an image forming device main unit 120.

The CPU 111 performs various computations and controls components of the image forming device 110 by executing programs.

The ROM 112 is a nonvolatile memory storing programs for device control, communication control, etc. while storing information necessary for processes in the image forming device 110.

The RAM 113 is a volatile memory providing work areas used when the CPU 111 executes various programs.

The storage 114 is a nonvolatile storage device for storing a variety of setting information, management information, etc.

The NIC 115 is a communication interface for connecting to the first network 104 and performing communication.

The circuit IF 116 is a communication interface for connecting to the second network 106 and performing communication. In cases where the second network 106 is a public switched telephone network, the circuit IF 116 includes a modem.

The operation panel 117 displays various screen images while receiving inputs such as commands from the user. For example, the operation panel 117 can be formed with a touch panel.

The NFC unit 118 is a communication interface for performing near field communication by using radio. The NFC unit 118 includes the NFC tag 119 providing information that has been set thereto.

The image forming device main unit 120 is a multifunction device main unit that performs processes in regard to images.

For example, the image forming device main unit 120 performs a process of acquiring image data from a document, a process of forming an image on a medium according to image data, and so forth.

Here, a device storage section storing information necessary for processes in the image forming device 110 is implemented by the CPU 111 controlling the ROM 112, the RAM 113 or the storage 114.

A device communication section is implemented by the CPU 111 controlling the NIC 115 or the circuit IF 116.

A device display section and a device input section are implemented by the CPU 111 controlling the operation panel 117.

A device near field communication section is implemented by the CPU 111 controlling the NFC unit 118.

A near field information provision section is implemented by the CPU 111 controlling the NFC tag 119.

Figure 3:
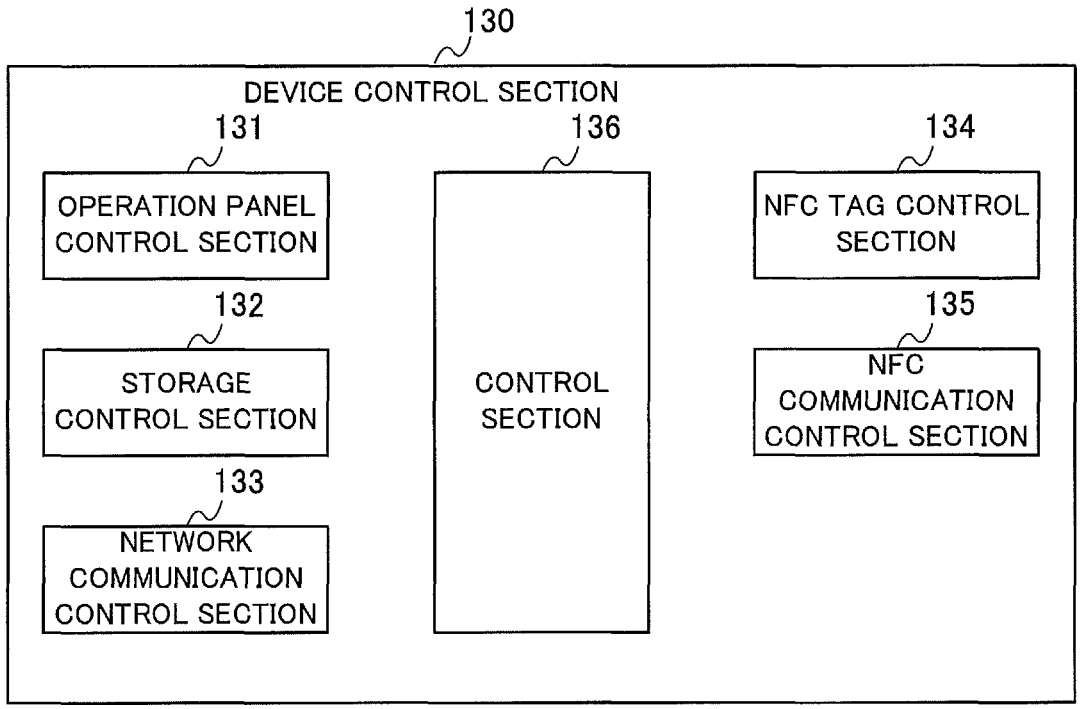
FIG. 3 is a block diagram schematically showing the software configuration of the image forming device in the first and second embodiments.

FIG. 3 is a block diagram schematically showing the software configuration of the image forming device 110 in the first embodiment.

A device control section 130 controlling the overall processing in the image forming device 110 is implemented by the software of the image forming device 110.

For example, when the device control section 130 makes the operation panel 117 display a first destination input screen image for inputting a destination of transmission of image data (transmission destination), the device control section 130 stores application information, which is used for making the mobile terminal 150 activate a predetermined application, in the NFC tag 119. Then, when the mobile terminal 150 is placed in proximity of the NFC unit 118 while the first destination input screen image is displayed on the operation panel 117, the device control section 130 acquires a destination list, which includes at least one destination registered in the mobile terminal 150, via the NFC unit 118, and makes the operation panel 117 display a second destination input screen image on which the destination of the transmission of the image data can be inputted by selecting a destination included in the destination list.

Incidentally, when the operation panel 117 displays the first destination input screen image, the device control section 130 also stores mode information, indicating a mode of the transmission of the image data by the image forming device 110, in the NFC tag 119. Here, the mode corresponds to one function selected from a plurality of functions the image forming device 110 is capable of executing. The mode information is information indicating the one function.

The device control section 130 includes an operation panel control section 131, a storage control section 132, a network communication control section 133, an NFC tag control section 134, an NFC communication control section 135 and a control section 136.

The operation panel control section 131 controls the operation panel 117. For example, the operation panel control section 131 commands content to be displayed on the operation panel 117 according to a request from a program in the image forming device 110, and transfers the contents of an input to the operation panel 117 by an operator to a program.

The storage control section 132 controls the ROM 112, the RAM 113 and the storage 114. For example, the storage control section 132 stores the contents of an input by the operator in one of the ROM 112, the RAM 113 and the storage 114.

The network communication control section 133 controls the NIC 115 and the circuit IF 116. For example, the network communication control section 133 transmits and receives data to/from the first network 104 via the NIC 115, and transmits and receives data to/from the second network 106 via the circuit IF 116.

The NFC tag control section 134 controls the NFC tag 119. For example, the NFC tag control section 134 writes information to the NFC tag 119.

The NFC communication control section 135 controls the NFC unit 118. For example, the NFC communication control section 135 performs the near field communication by using radio via the NFC unit 118.

The control section 136 controls the operation panel control section 131, the storage control section 132, the network communication control section 133, the NFC tag control section 134 and the NFC communication control section 135.

Figure 4:
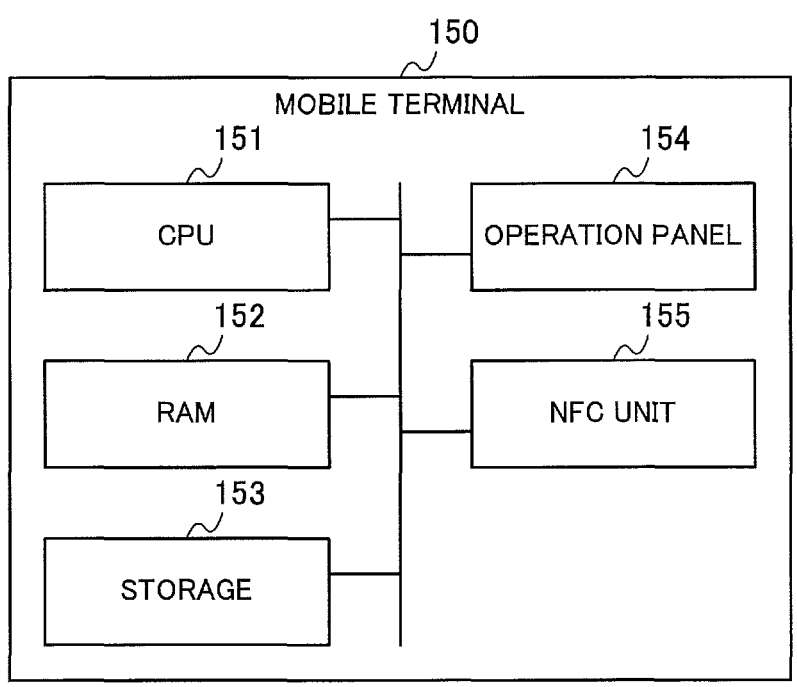
FIG. 4 is a block diagram schematically showing the hardware configuration of a mobile terminal in the first to third embodiments.

FIG. 4 is a block diagram schematically showing the hardware configuration of the mobile terminal 150 in the first embodiment.

The mobile terminal 150 includes a CPU 151, a RAM 152, storage 153, an operation panel 154 and the NFC unit 155.

The CPU 151 performs various computations and controls components of the mobile terminal 150 by executing programs.

The RAM 152 is a volatile memory providing areas for storing various programs loaded from the storage 153 and work areas used when the CPU 151 executes various programs.

The storage 153 is a nonvolatile storage device for storing an OS (Operating System), various control programs and various application programs (applications).

The operation panel 154 displays various screen images while receiving inputs such as commands from the user. For example, the operation panel 154 can be formed with a touch panel.

The NFC unit 155 is a communication interface for performing the near field communication by using radio. For example, when the mobile terminal 150 is brought physically close to the NFC unit 118, the NFC unit 155 acquires information from the NFC tag 119 according to the NFC standard and performs communication with the NFC unit 118. Incidentally, the NFC unit 155 is referred to also as a terminal NFC unit.

Here, a terminal storage section storing information necessary for processes in the mobile terminal 150 is implemented by the CPU 151 controlling the RAN 152 or the storage 153.

A terminal display section and a terminal input section are implemented by the CPU 151 controlling the operation panel 154.

A terminal near field communication section is implemented by the CPU 151 controlling the NFC unit 155.

Figure 5:
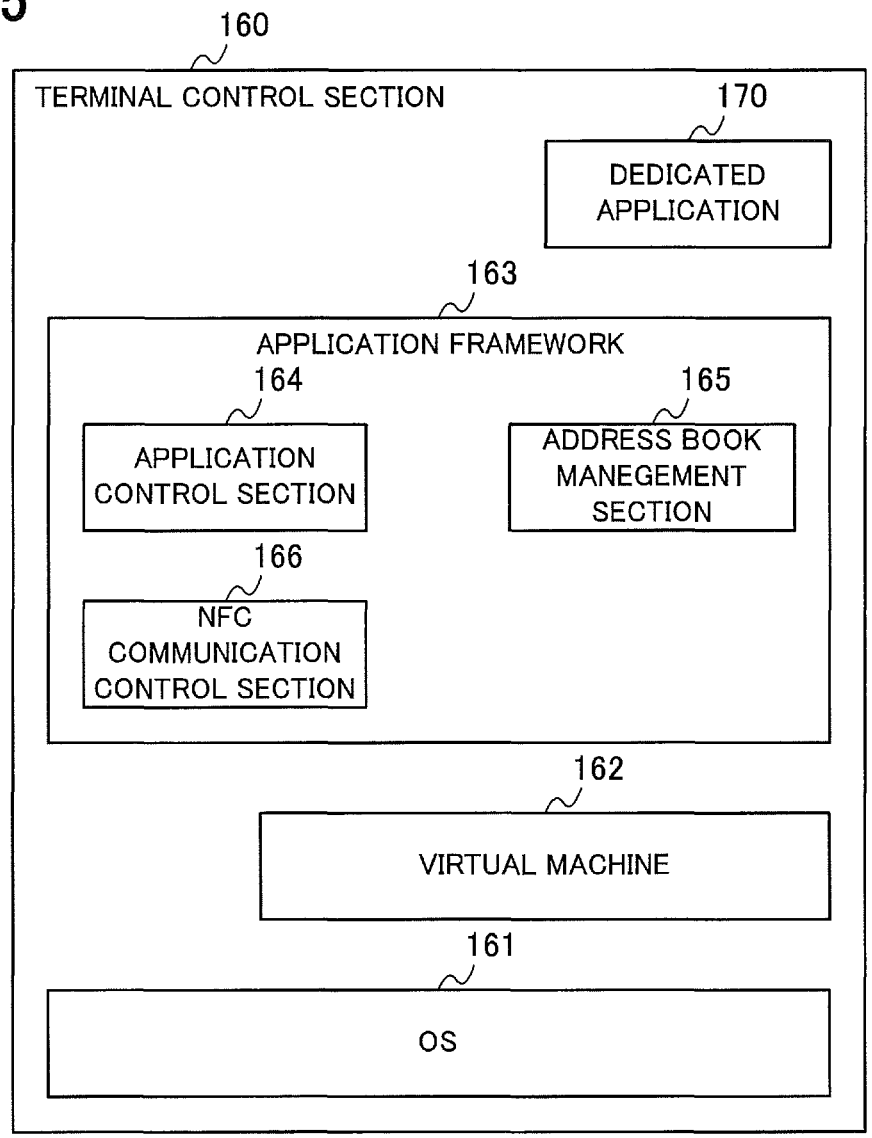
FIG. 5 is a block diagram schematically showing the software configuration of the mobile terminal in the first embodiment.

FIG. 5 is a block diagram schematically showing the software configuration of the mobile terminal 150 in the first embodiment.

A terminal control section 160 controlling the overall processing in the mobile terminal 150 is Implemented by the software of the mobile terminal 150.

For example, when the mobile terminal 150 is placed in proximity of the NFC unit 118 of the image forming device 110 while the first destination input screen image is displayed on the operation panel 117 of the image forming device 110, the NFC unit 155 communicates with the NFC tag 119. Then, the terminal control section 160 acquires the application information via the NFC unit 155 and activates a predetermined application according to the acquired application information. The terminal control section 160 generates a destination list whose at least one list item includes at least one destination registered in at least one of a plurality of items included in an address book of the terminal control section 160 itself. The terminal control section 160 makes the NFC unit 155 transmit the generated destination list to the NFC unit 118. The destination list is information indicating at least one destination.

Here, the terminal control section 160 acquires the mode information of the image forming device 110 together with the application information, determines at least one destination corresponding to the mode information out of a plurality of items included in the address book of the terminal control section 160 itself, and generates the destination list containing a list item including the determined at least one destination.

The terminal control section 160 includes an OS 161, a virtual machine 162, an application framework 163 and a dedicated application 170.

The OS 161 is a basic program controlling the whole of the mobile terminal 150.

The virtual machine 162 provides an environment in which the OS 161 executes various applications.

The application framework 163 provides a variety of information and functions. The variety of information and functions provided by the application framework 163 are shared in common, and can be used by various applications in the mobile terminal 150 such as the dedicated application 170.

The application framework 163 includes an application control section 164, an address book management section 165, and an NFC communication control section 166.

The application control section 164 performs control of life cycles of applications, such as addition, activation and deletion of applications.

The address book management section 165 performs management of a terminal address book such as addition and deletion of destinations, and provides various applications with the contents of destinations. The terminal address book includes a plurality of items, each of which is configured so that a plurality of destinations can be registered for an opposite party of communication by use of the mobile terminal 150. Incidentally, the terminal address book is stored in the storage 153.

The NFC communication control section 166 controls the NFC unit 155. For example, the NFC communication control section 166 performs the near field communication by using radio via the NFC unit 155.

The dedicated application 170 performs processes regarding the destinations in the first embodiment. For example, the dedicated application 170 generates a destination list by collecting destinations stored in the mobile terminal 150 and makes the NFC communication control section 166 transmit the generated destination list to the image forming device 110.

Figure 6:
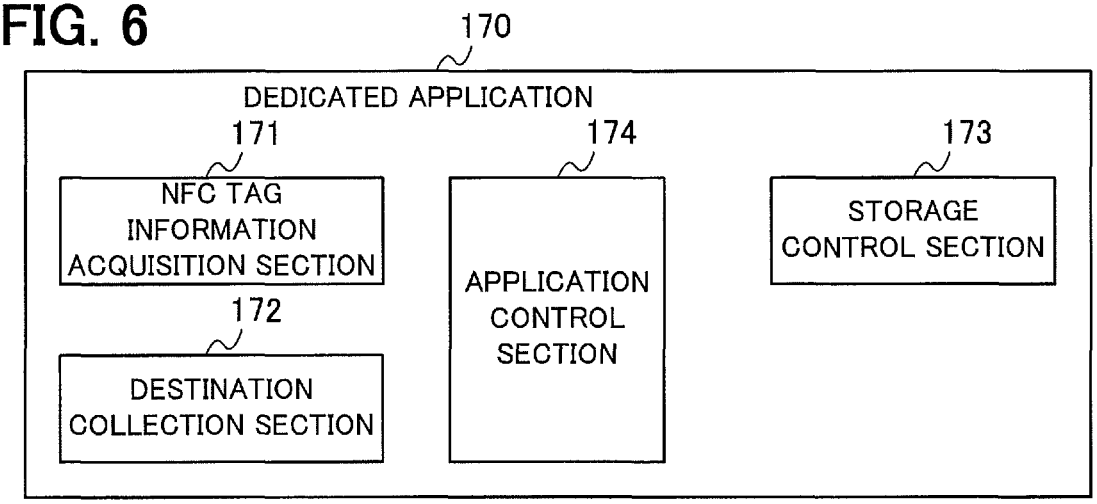
FIG. 6 is a block diagram schematically showing the configuration of a dedicated application in the first embodiment.

FIG. 6 is a block diagram schematically showing the configuration of the dedicated application 170 in the first embodiment.

The dedicated application 170 includes an NFC tag information acquisition section 171, a destination collection section 172, a storage control section 173 and an application control section 174.

The NFC tag information acquisition section 171 acquires information stored in the NFC tag 119 via the NFC unit 155.

The destination collection section 172 collects at least one destination registered in the terminal address book from the address book management section 165 and generates a destination list made up of list items including the collected destinations.

The storage control section 173 stores the information acquired by the NFC tag information acquisition section 171 and the destination list generated by the destination collection section 172 in the RAM 152 or the storage 153.

The application control section 174 controls processes regarding the destinations in the mobile terminal 150. For example, the application control section 174 controls the NFC tag information acquisition section 171, the destination collection section 172 and the storage control section 173.

The general outline of processes in the image forming system 100 according to the first embodiment will be described below.

First, in the image forming device 110, the user activates a function demanding an input of a destination among a plurality of functions the image forming device 110 is capable of executing, and makes the image forming device 110 display a destination input screen.

Subsequently, the user places the mobile terminal 150 in proximity of the image forming device 110 and thereby makes the mobile terminal 150 transmit the destination list to the image forming device 110 by radio.

The image forming device 110 displays a destination included in the received destination list on the destination input screen, and the user inputs a destination by selecting the displayed destination, for example. The image forming device 110 performs email transmission to the inputted destination.

Figure 7:
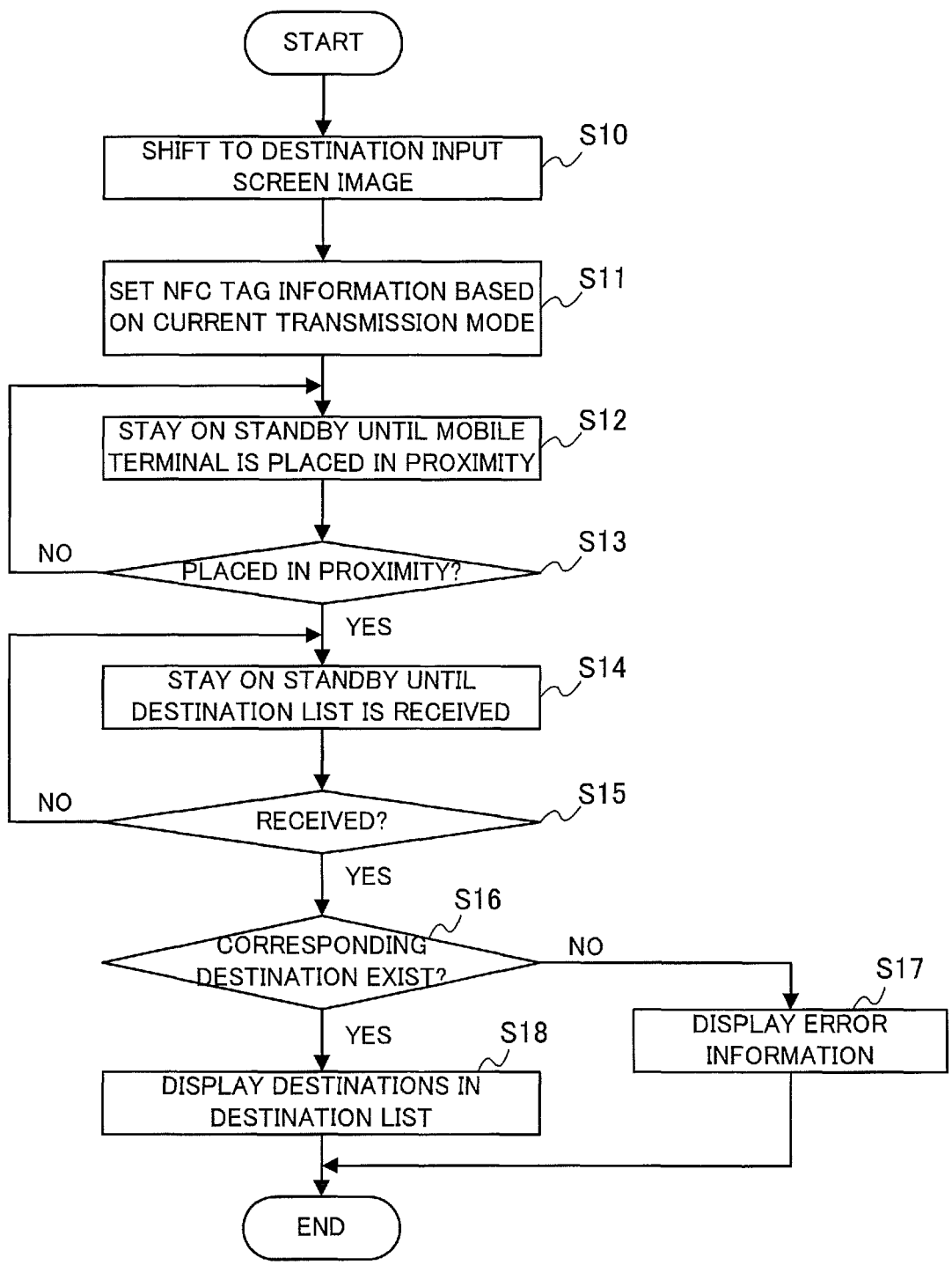
FIG. 7 is a flowchart showing a process in the image forming device in the first embodiment.

FIG. 7 is a flowchart showing a process in the image forming device 110 in the first embodiment.

The flowchart shown in FIG. 7 is started by the user activating a function of the image forming device 110 demanding an input of a destination. The following explanation will be given assuming that the function demanding an input of a destination is an email transmission function as a function of transmitting, by email, image data which are scanned by the image forming device 110.

First, when the email transmission function is activated by the user, the operation panel control section 131 makes the operation panel 117 display a destination input screen image (S10). The destination input screen image displayed in the step S10 is referred to also as a first destination input screen image, and the destination inputted on the first destination input screen image is referred to also as a transmission destination.

Figure 8:
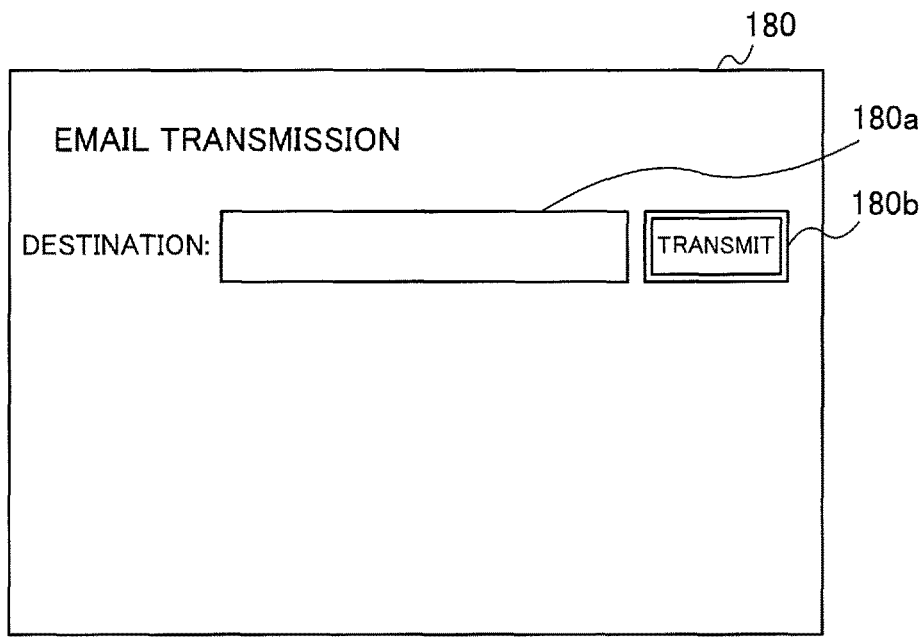
FIG. 8 is a schematic diagram showing a first example of a destination input screen image in the first embodiment.

FIG. 8 is a schematic diagram showing an example of the destination input screen image.

The destination input screen image 180 shown in FIG. 8 includes a destination input box 180*a* functioning as, a destination input region for inputting a destination and a transmission button 180*b* functioning as a transmission command, input region for inputting a transmission command.

Returning to FIG. 7, when the operation panel control section 131 has the destination input screen image 180 displayed, the NFC tag control section 134 writes NFC tag information in the NFC tag 119 (S11).

Figure 9:
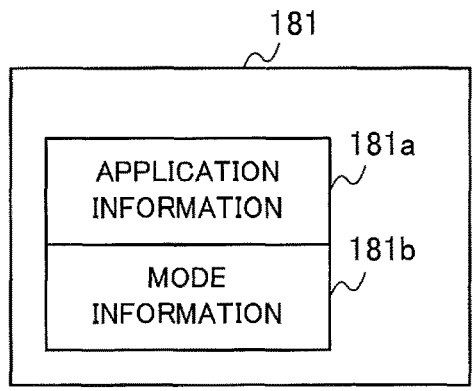
FIG. 9 is a schematic diagram showing an example of NFC tag information in the first embodiment.

FIG. 9 is a schematic diagram showing an example of the NFC tag information.

The NFC tag information 181 includes application information 181*a* indicating an application to be activated and mode information 181*b* indicating a mode (function being executed) in which the image forming device 110 transmits image data.

In this example, the NFC tag control section 134 stores a package name of the dedicated application 170, which is a predetermined application, as the application information 181*a*, and stores information indicating an email transmission mode, which represents the email transmission function, as the mode information 181*b*.

Returning to FIG. 7, the control section 136 stays on standby until the mobile terminal 150 is placed in proximity of the image forming device 110 (S12).

When the NFC communication control section 135 detects that the mobile terminal 150 has been placed in proximity of the image forming device 110 (YES in S13), the process proceeds to step S14.

In the step S14, the control section 136 stays on standby for a predetermined time until the destination, list is received from the mobile terminal 150.

When the NFC communication control section 135 receives the destination list from the mobile terminal 150 (YES in S15), the process proceeds to step S16. Incidentally, the received destination list is stored in the ROM 112, the RAM 113 or the storage 114 by the storage control section 132.

In the step S16, the control section 136 determines whether or not an item including a destination corresponding to the mode information 181*b* written in the step S11 is included in the destination list from the mobile terminal 150. If such an item is not included (NO in S16), the Process proceeds to step S17. If such an item is included (YES in S16), the process proceeds to step S18.

In the step S17, the operation panel control section 131 displays error information on the operation panel 117. The error information in this case is assumed to indicate that no destination is found although it is recognized that the mobile terminal 150 has been placed in proximity of the image forming device 110.

In the step S18, the operation panel control section 131 has a destination input screen image displayed on the operation panel 117 so that a destination included in the received destination list can be selected. Incidentally, the destination input screen image displayed in the step S18 is referred to also as the second destination input screen image, and the destination inputted on the second destination input screen image is referred to also as the transmission destination.

Figure 10:
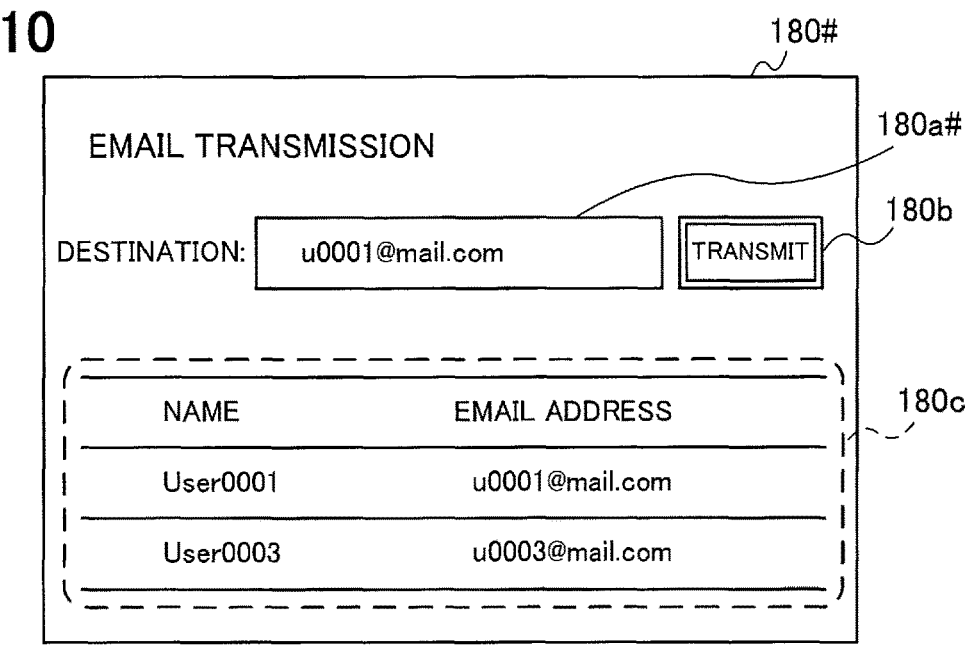
FIG. 10 is a schematic diagram showing a second example of the destination input screen image in the first embodiment.

FIG. 10 is a schematic diagram showing an example of the destination input screen image displayed so that a destination included in the received destination list can be selected. The destination input screen image 180# shown in FIG. 10 includes a destination input box 180a#, the transmission button 180b, and a destination selection region 180c in which a destination included in the received destination list can be selected.

In the destination selection region 180c, destination names (names of devices as destinations) and destinations (email addresses) included in the items of the received destination list are displayed. The user can input a destination to the destination input box 180a# by touching a destination name or a destination.

Incidentally, the first destination in the destination list (the destination in the uppermost item) is selected by default and the selected destination is input in the destination input box 180a# automatically as shown in FIG. 10.

Figures 11, 12, 13:
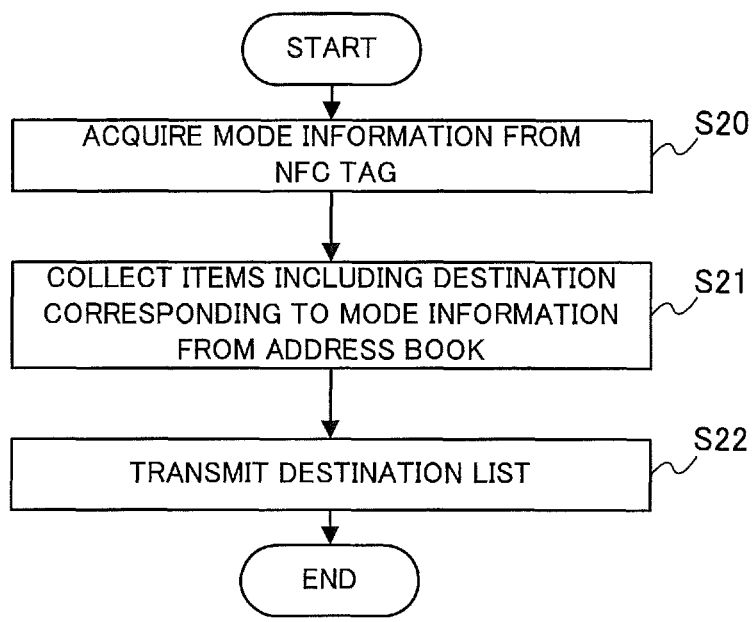
FIG. 11 is a flowchart showing a process in the mobile terminal in the first embodiment.
FIG. 12 is a schematic diagram showing an example of a terminal address book of the mobile terminal in the first embodiment.
FIG. 13 is a schematic diagram showing an example of a destination list in the first embodiment.

FIG. 11 is a flowchart showing a process in the mobile terminal 150 in the first embodiment.

The flowchart shown in FIG. 11 is started when the mobile terminal 150 is placed in proximity of the image forming device 110 while the destination input screen image 180 is displayed on the operation panel 117 of the image forming device 110, that is, when the mobile terminal 150 is within a predetermined range from the image forming device 110 and the NFC unit 155 of the mobile terminal 150 can communicate with the NFC tag 119 of the image forming device 110 to acquire information from the NFC tag 119.

First, when the mobile terminal 150 is placed in proximity of the image forming device 110, by referring to the application information 181a stored in the NFC tag 119, the OS 161 recognizes the package name of the dedicated application 170 to activate the dedicated application 170 in the environment of the virtual machine 162. The NFC tag information acquisition section 171 of the dedicated application 170 acquires the mode information 181b stored in the NFC tag 119 and makes the storage control section 173 store the mode information 181b in the RAM 152 or the storage 153 (S20). In this example, the mode information 181b is assumed to indicate the email transmission mode.

The destination collection section 172 issues a command to the address book management section 165 and collects, from the terminal address book stored in the storage 153, items including a destination corresponding to the mode indicated by the mode information 181b stored in the step S20 (S21). In this case, since the mode information 181b indicates the email transmission mode, items including an email address are collected.

The destination collection section 172 generates list items by extracting predetermined contents from the collected items and generates a destination list made up of the generated list items.

For example, it is assumed that the terminal address book stored in the storage 153 of the mobile terminal 150 is a terminal address book table 182 shown in FIG. 12.

The destination collection section 172 collects records 182a and 182c including email addresses as a destination corresponding to the email transmission mode from among the records 182a to 182d as the items of the terminal address book table 182, and generates a destination list 183 shown in FIG. 13, for example. The destination list 183 does not include a facsimile number as a destination corresponding to a facsimile transmission mode which is a mode different from the email transmission mode. This is because the destination list 183 does not have to include unnecessary information.

The destination collection section 172 does not collect the records 182b and 182d since these records do not include an email address.

Incidentally, in the terminal address book table 182, both of the email addresses and the facsimile numbers corresponds to destinations, and both of the names and the phone numbers corresponds to identification information for identifying an opposite party.

Then, the application control section 174 has the generated destination list 183 transmitted from the NFC unit 155 to the image forming device 110 by issuing a command to the NFC communication control section 166 (S22).

As described above, according to the first embodiment, when a function of the image forming device 110 demanding an input of a destination is used, the destination can be inputted with ease. The terminal address book which has already been managed and used in the mobile terminal 150 can be utilized efficiently, and the trouble of manual operation and the inputting error problem due to manual input are eliminated by making use of NFC.

Especially, since NFC needs no previous connection settings and just "placing in proximity" is enough for the communication between devices, the destination list 183 can be transmitted from the mobile terminal 150 to the image forming device 110 with ease.

While the mobile terminal 150 generates the destination list including destinations corresponding to the mode information and transmits the destination list to the image forming device 110 in the first embodiment described above, the first embodiment is not limited to such an example. For example, the mobile terminal 150 may generate a destination list with list items corresponding to all or part of the items included in the terminal address book and, transmit such a destination list to the image forming device 110. The image forming device 110 may determine destinations corresponding to the mode information out of the destination list sent from the mobile terminal 150 and display the determined destinations in the destination selection region of the destination input screen image. In this case, the image forming device 110 does not need to store the mode information in the NFC tag 119.

Second Embodiment

As shown in FIG. 1, an image forming system 200 according to a second embodiment includes the image forming device 110 and a mobile terminal 250.

The image forming device 110 in the second embodiment is the same as the image forming device 110 in the first embodiment.

Further, the hardware configuration of the mobile terminal 250 in the second embodiment is equivalent to the hardware configuration of the mobile terminal 150 in the first embodiment.

Figure 14:
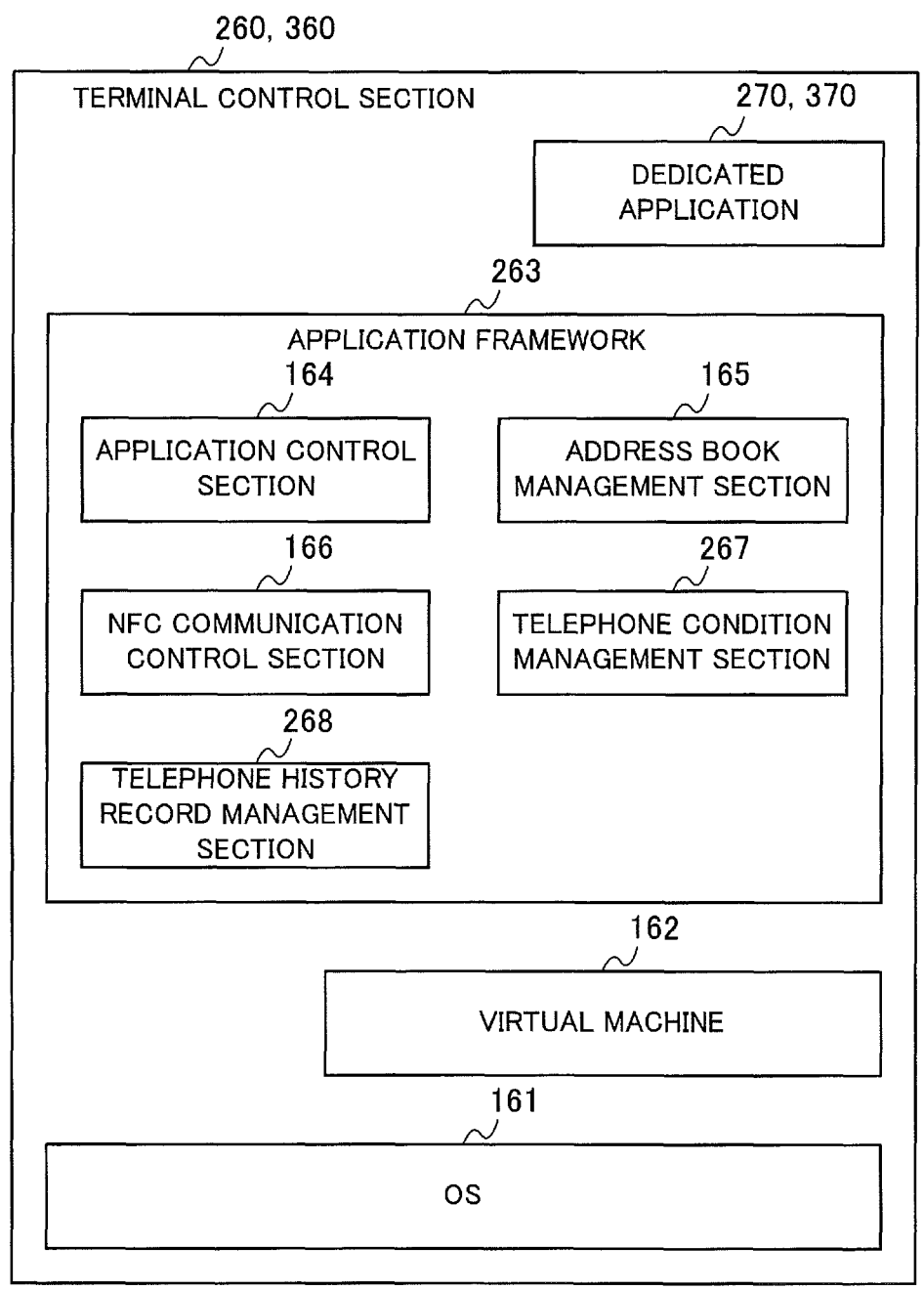
FIG. 14 is a block diagram schematically showing the software configuration of the mobile terminal in the second and third embodiments.

FIG. 14 is a block diagram schematically showing the software configuration of the mobile terminal 250 in the second embodiment.

A terminal control section 260 controlling the overall processing in the mobile terminal 250 is implemented by the software of the mobile terminal 250.

For example, if a phone call is in progress when the mobile terminal 250 is placed in proximity of the image forming device 110, the terminal control section 260 acquires the item of the opposite party of the phone call in progress from the terminal address book registered in the mobile terminal 250. If a destination corresponding to the mode information 181b acquired from the NFC tag 119 has been registered in the acquired item, the terminal control section 260 makes a list item including the destination in the destination list.

Further, the terminal control section 260 refers to history information indicating opposite parties of past phone calls made on the mobile terminal 250, to acquire an item corresponding to at least one opposite party indicated by the history information from the terminal address book registered in the mobile terminal 250. If a destination corresponding to the mode information 181b acquired from the NFC tag 119 has been registered in the acquired item, the terminal control section 260 makes a list item including the destination in the destination list. In this case, the terminal control section 260 may acquire an item of an opposite party of a phone call made in a predetermined period among the opposite parties indicated by the history information, or acquire items corresponding to a predetermined number of opposite parties among the opposite parties included in the history information.

The terminal control section 260 includes the OS 161, the virtual machine 162, an application framework 263 and a dedicated application 270.

The OS 161 and the virtual machine 162 of the terminal control section 260 in the second embodiment are the same as the OS 161 and the virtual machine 162 of the terminal control section 160 in the first embodiment.

The application framework 263 in the second embodiment includes the application control section 164, the address book management section 165, the NFC communication control section 166, a telephone condition management section 267 and a telephone history record management section 268.

The application control section 164, the address book management section 165 and the NFC communication control section 166 of the application framework 263 in the second embodiment are the same as the application control section 164, the address book management section 165 and the NFC communication control section 166 of the application framework 163 in the first embodiment.

The telephone condition management section 267 manages a condition in regard to whether the mobile terminal 250 is in the middle of a phone call or not and provides various applications with telephone condition information indicating the condition.

The telephone history record management section 268 manages opposite parties of phone calls made on the mobile terminal 250, that is, history records of incoming phone calls and outgoing phone calls, as the history information, and provides the contents of the history information to be acquirable by various applications. Incidentally, the history information is stored in the storage 153.

The dedicated application 270 executes processes regarding the destinations in the second embodiment. For example, the dedicated application 270 generates a destination list by collecting destinations stored in the mobile terminal 250, sorts the order of the list items included in the destination list according to the history information, and makes the NFC communication control section 166 transmit the sorted destination list to the image forming device 110.

Figure 15:
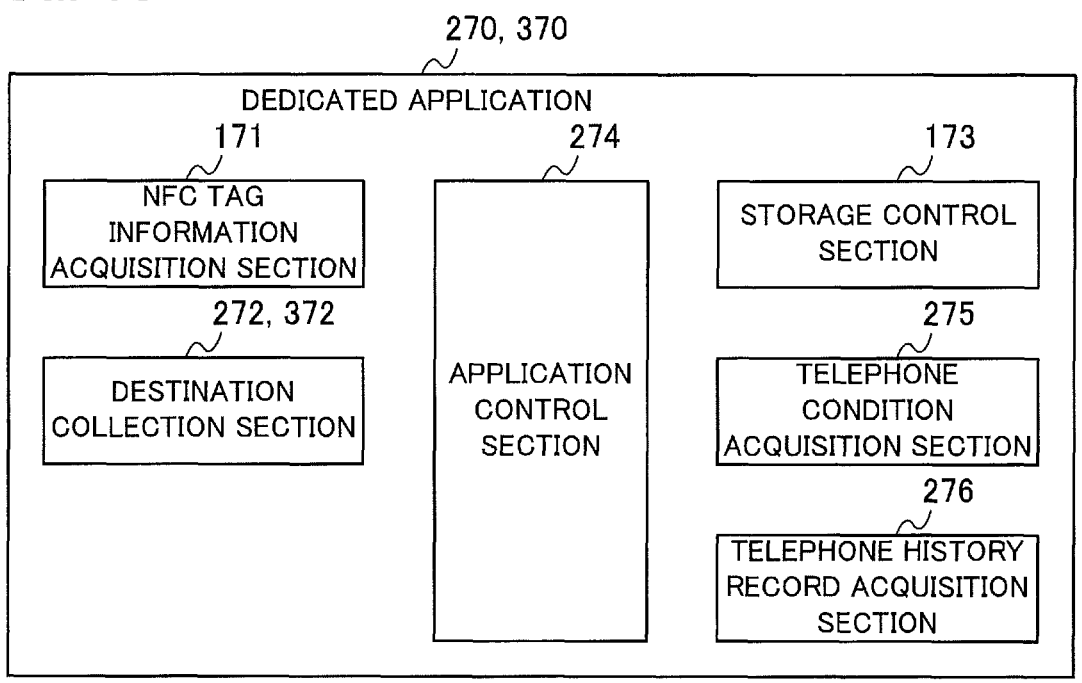
FIG. 15 is a block diagram schematically showing the configuration of a dedicated application in the second and third embodiments.

FIG. 15 is a block diagram schematically showing the configuration of the dedicated application 270 in the second embodiment.

The dedicated application 270 includes the NFC tag information acquisition section 171, a destination collection section 272, the storage control section 173, an application control section 274, a telephone condition acquisition section 275 and a telephone history record acquisition section 276.

The NFC tag information acquisition section 171 and the storage control section 173 of the dedicated application 270 in the second embodiment are the same as the NFC tag information acquisition section 171 and the storage control section 173 of the dedicated application 170 in the first embodiment.

The telephone condition acquisition section 275 acquires, from the telephone condition management section 267, the telephone condition information indicating whether the mobile terminal 250 is in the middle of a phone call or not.

The telephone history record acquisition section 276 acquires a predetermined number of items or items included in a predetermined period from the history information managed by the telephone history record management section 268.

The application control section 274 controls processes regarding the destinations in the mobile terminal 250. For example, the application control section 274 controls the NFC tag information acquisition section 171, the destination collection section 272, the storage control section 173, the telephone condition acquisition section 275 and the telephone history record acquisition section 276.

The destination collection section 272 collects corresponding destinations from the address book management section 165 according to the telephone condition information acquired by the telephone condition acquisition section 275 and the history information acquired by the telephone history record acquisition section 276, and generates a destination list made up of list items including the collected destinations.

FIG. 16 is a flowchart showing a process in the mobile terminal 250 in the second embodiment.

Among the steps included in the flowchart shown in FIG. 16, the same steps as those in the flowchart shown in FIG. 11 are assigned the same reference characters as in FIG. 11 and detailed explanation for them is omitted.

The flowchart shown in FIG. 16 is also started when the mobile terminal 250 is placed in proximity of the image forming device 110.

First, when the mobile terminal 250 is placed in proximity of the image forming device 110, the NFC tag information acquisition section 171 acquires the mode information 181b stored in the NFC tag 119 and the storage control section 173 stores it in the RAM 152 or the storage 153 (S20). In this example, the mode information 181b is assumed to indicate the email transmission mode.

The telephone condition acquisition section 275 acquires the telephone condition information stored in the storage 153 by issuing a command to the telephone condition management section 267. Then, the application control section 274 determines whether the mobile terminal 250 is in the middle of a phone call or not by referring to the telephone condition information (S30). If the mobile terminal 250 is in the middle of a phone call (YES in S30), the process proceeds to step S32, if the mobile terminal 250 is not in the middle of a phone call (NO in S30), the process proceeds to step S31.

In the step S31, the telephone history record acquisition section 276 acquires the history information stored in the storage 153 by issuing a command to the telephone history record management section 268. Then, the application control section 274 determines whether or not an opposite party whose elapsed time from the end of a phone call is within a predetermined period exists in the history information. Here, the predetermined period is assumed to be 30 seconds, for example. If such an opposite party exists (YES in S31), the process proceeds to the step S32. If no such opposite party exists (NO in S31), the process proceeds to the step S21.

In the step S32, the destination collection section 272 acquires an item including a destination of the opposite party in the middle of a phone call or the opposite party whose time elapsed from the end of a phone call is within the predetermined period by issuing a command to the address book management section 165 and determines whether or not any acquired item including a destination corresponding to the mode information 181b acquired from the NFC tag 119 exists. If any acquired item including such a destination exists, the destination list is generated with contents included in such an item. In this example, only list items including an email address corresponding to the email transmission mode as the destination are generated. Namely, list items corresponding to items in which no email address has been registered, among the items of opposite parties in the middle of a phone call or opposite parties whose time elapsed from the end of a phone call is within the predetermined period, are not added to the destination list. Thereafter, the process proceeds to the step S22.

Incidentally, in the step S32, among destinations of the opposite party which is received the determination of being in the middle of a phone call, the destination corresponding to the mode information 181b (email address in this example) is referred to also as a first destination, and a list item including the first destination is referred to also as a first list item.

Further, in the step S32, among destinations of the opposite party of the phone call made within the predetermined period, the destination corresponding to the mode information 181b (email address in this example) is referred to also as a second destination, and a list item, including the second destination is referred to also as a second list item.

In the step S21, the destination collection section 272 collects items including a destination corresponding to the mode indicated by the mode information 181b stored in the step S20 from the terminal address book stored in the storage 153 by issuing a command to the address book management section 165, and generates the destination list with the collected items.

The telephone history record acquisition section 276 acquires the history information stored in the storage 153 by issuing a command to the telephone history record management section 268. Then, the application control section 274 refers to the history information and sorts the generated destination list according to the history records of phone calls (S33), in this example, the destination list is sorted so that the list items of the destination list are placed from the bottom in the order of phone calls. In other words, the list items are processed to be arranged in reverse order of phone calls.

For example, it is, assumed here that the terminal address book stored in the storage 153 of the mobile terminal 250 is a terminal address book table 182 like the one shown in FIG. 12.

Further, the history information stored in the storage 153 of the mobile terminal 250 is assumed to be a history table 184 shown in FIG. 17.

Figures 18, 19:
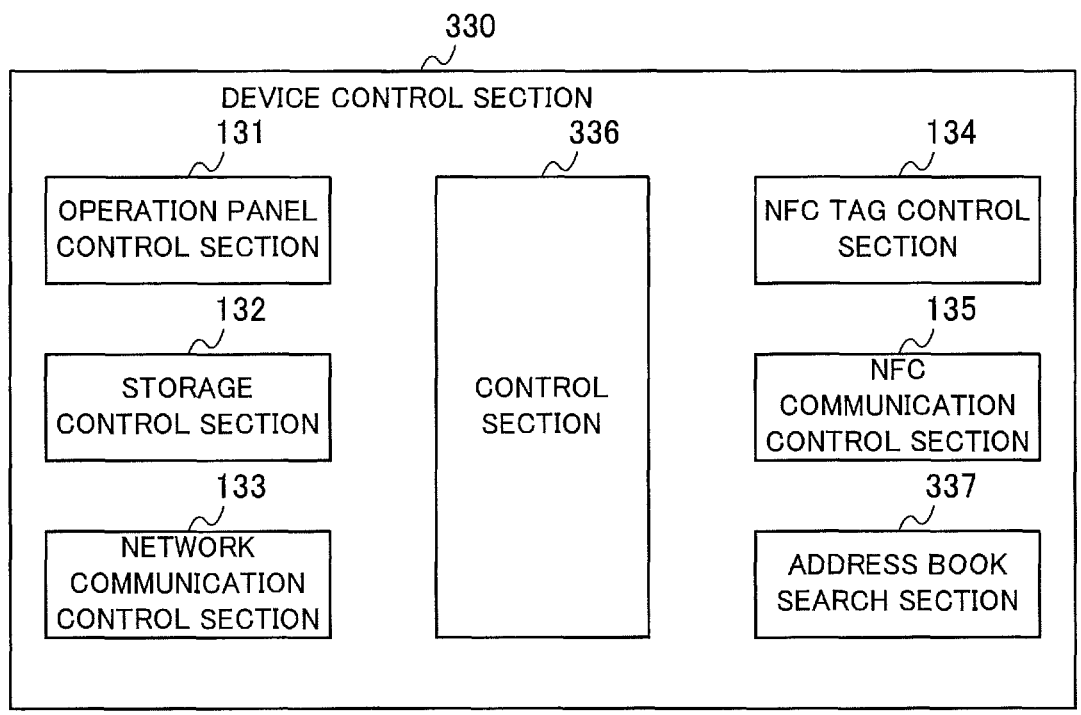
FIG. 18 is a schematic diagram showing an example of a destination list in the second embodiment.
FIG. 19 is a block diagram schematically showing the software configuration of an image forming device in the third embodiment.

In this case, the destination list sorted in the step S33 is like the destination list 183# shown in FIG. 18.

Specifically, in the step S21, items including a destination corresponding to the email transmission mode are collected and the destination list 183 shown in FIG. 13 is generated.

Further, in the history table 184 shown in FIG. 17, a phone call with the phone number "0120-000-0001" of "User0001" has been made earlier. Accordingly, the item in the destination list 183 corresponding to "User0001" is arranged below "User0003", by which the destination list 183# is formed.

Returning to FIG. 16, in the step S22, the application control section 274 has the destination list transmitted from the NFC unit 155 to the image forming device 110 by issuing a command to the NFC communication control section 166.

As described above, according to the second embodiment, in addition to the effects of the first embodiment, the destination of an opposite party the user recently communicated with can be found with ease based on the telephone condition and the telephone history records.

Incidentally, while the process proceeds to the step S22 after the processing of the step S32 in FIG. 16 in the second embodiment described above, the second embodiment is not limited to such an example. For example, the process may proceed to the step S21 after the processing of the step S32 in FIG. 16. In such cases, the destination collection section 272 deletes list items redundant in terms of the destination from the list items included in the destination list.

Further, while the application control section 274 determines whether or not there exists an opposite party of a phone call made within the predetermined period in the above-described step S31, the second embodiment is not limited to such an example. For example, the destination collection section 272 may identify a predetermined number of opposite parties among opposite parties of recent phone calls based on the history information in the step S31 and add destinations corresponding to the mode information 181b, among the destinations of the identified opposite parties, to the destination list in the step S32. In such cases, the processing of the step S21 and the step S33 may be left out, or the process may proceed to the step S21 after the step S32.

While the flowchart shown in FIG. 16 includes both the step S30 and the step S31 in the second embodiment described above, the flowchart of FIG. 16 may be configured to include only one of the step S30 and the step S31.

While the mobile terminal 250 generates a destination list including destinations corresponding to the mode information and transmits the destination list to the image forming device 110 in the second embodiment described above, the second embodiment is not limited to such an example. For example, the mobile terminal 250 may generate a destination list with list items corresponding to all or part of the items included in the terminal address book and transmit such a destination list to the image forming device 110. Here, the part of the items may be an item corresponding to an opposite party in the middle of a phone call on the mobile terminal 250, or items corresponding to opposite parties determined based on the history information. The image forming device 110 may determine destinations corresponding to the mode information out of the destination list sent from the mobile terminal 250 and display the determined destinations in the destination selection region of the destination input screen image. In this case, the image forming device 110 does not need to store the mode information in the NFC tag 119.

Third Embodiment

As shown in FIG. 1, an image forming system 300 according to a third embodiment includes an image forming device 310 and a mobile terminal 350.

The hardware configurations of the image forming device 310 and the mobile terminal 350 in the third embodiment are equivalent to the hardware configurations of the image forming device 110 and the mobile terminal 150 in the first embodiment.

FIG. 19 is a block diagram schematically showing the software configuration of the image forming device 310 in the third embodiment.

A device control section 330 controlling the overall processing in the image forming device 310 is implemented by the software of the image forming device 310.

For example, when the list items included in the destination list acquired from the mobile terminal 350 include a list item which is not including a destination corresponding to the mode in which the image forming device 310 transmits image data, the device control section 330 adds the destination necessary for the list item by using the destinations registered in the device address book registered in the image forming device 310.

The device control section 330 includes the operation panel control section 131, the storage control section 132, the network communication control section 133, the NFC tag control section 134, the NFC communication control section 135, a control section 336 and an address book search section 337.

The operation panel control section 131, the storage control, section 132, the network communication control section 133, the NFC tag control section 134 and the NFC communication control section 135 of the device control section 330 in the third embodiment are the same as the operation panel control section 131, the storage control section 132, the network communication control section 133, the NFC tag control section 134 and the NFC communication control section 135 of the device control section 130 in the first embodiment.

The control section 336 executes the same processes as the control section 136 in the first embodiment, and executes a destination list analysis process. In the destination list analysis process, the control section 336 analyzes the items of the destination list from the mobile terminal 350, and, when there exists a list item which does not include a destination corresponding to the mode information 181b, add a corresponding destination to such a list item.

The address book search section 337 executes a process of searching for destinations corresponding to the mode information 181b by referring to the device address book stored in the ROM 112 or the storage 114 of the image forming device 310. The device address book includes a plurality of items (records) and each of the plurality of items is configured so that a plurality of destinations can be registered for each opposite party with which the image forming device 310 performs communication.

Next, the mobile terminal 350 in the third embodiment will be described below.

As mentioned earlier, the hardware configuration of the mobile terminal 350 in the third embodiment is equivalent to the hardware configuration of the mobile terminal 150 in the first embodiment.

A terminal control section 360 shown in FIG. 14, which controls the overall processing in the mobile terminal 350, is implemented by the software of the mobile terminal 350 in the third embodiment.

For example, if the mobile terminal 350 is placed in proximity of the image forming device 310 during a phone call, the terminal control section 360 acquires the item of the opposite party of the phone call in progress from the terminal address book registered in the mobile terminal 350 and adds a list item including contents (e.g., identification information on the opposite party) extracted from the acquired item to the destination list.

Further, the terminal control section 360 refers to the history information indicating opposite parties of past phone calls made on the mobile terminal 350 and adds, to the destination list, a list item including contents extracted from an item corresponding to at least one opposite party included in the terminal address book registered in the mobile terminal 350.

The list items included in the destination list generated as above do not need to include a destination corresponding to the mode indicated by the mode information 181b.

As shown in FIG. 14, the terminal control, section 360 in the third embodiment includes the OS 161, the virtual machine 162, the application framework 263 and a dedicated application 370.

The OS 161 and the virtual machine 162 of the terminal control section 360 in the third embodiment are the same as the OS 161 and the virtual machine 162 of the terminal control section 160 in the first embodiment. The application framework 263 of the terminal control section 360 in the third embodiment is the same as the application framework 263 of the terminal control section 260 in the second embodiment.

As shown in FIG. 15, the dedicated application 370 in the third embodiment includes the NFC tag information acquisition section 171, a destination collection section 372, the storage control section 173, the application control section 274, the telephone condition acquisition section 275 and the telephone history record acquisition section 276.

The NFC tag information acquisition section 171 and the storage control section 173 of the dedicated application 370 in the third embodiment are the same as the NFC tag information acquisition section 171 and the storage control section 173 of the dedicated application 170 in the first embodiment.

The application control section 274, the telephone condition acquisition section 275 and the telephone history record acquisition section 276 of the dedicated application 370 in the third embodiment are the same as the application control section 274, the telephone condition acquisition section 275 and the telephone history record acquisition section 276 of the dedicated application 270 in the second embodiment.

The destination collection section 372 in the third embodiment executes substantially the same processes as the destination collection section 272 in the second embodiment, but in the step S32 of the flowchart shown in FIG. 16, the destination collection section 372 acquires an item including a destination of an opposite party in the middle of a phone call or an item whose elapsed time from the end of a phone call is within the predetermined period, by issuing a command to the address book management section 165, and generates the destination list with contents included in the acquired item. In the third embodiment, even contents of an item including a destination which is not corresponding to the mode information 181b is added as a destination to the destination list. For example, in the third embodiment, even contents of items in which no email address has been registered, among the items of the opposite parties in the middle of a phone call or within the fixed period since the end of a phone call, are added to the destination list.

Incidentally, while the process proceeds to the step S22 after the processing of the step S32 in FIG. 16, the process may also proceed to the step S21, in such cases, the destination collection section 372 deletes list items redundant in terms of any one of the name, the phone number and the destination from the list items included in the destination list.

Figure 20:
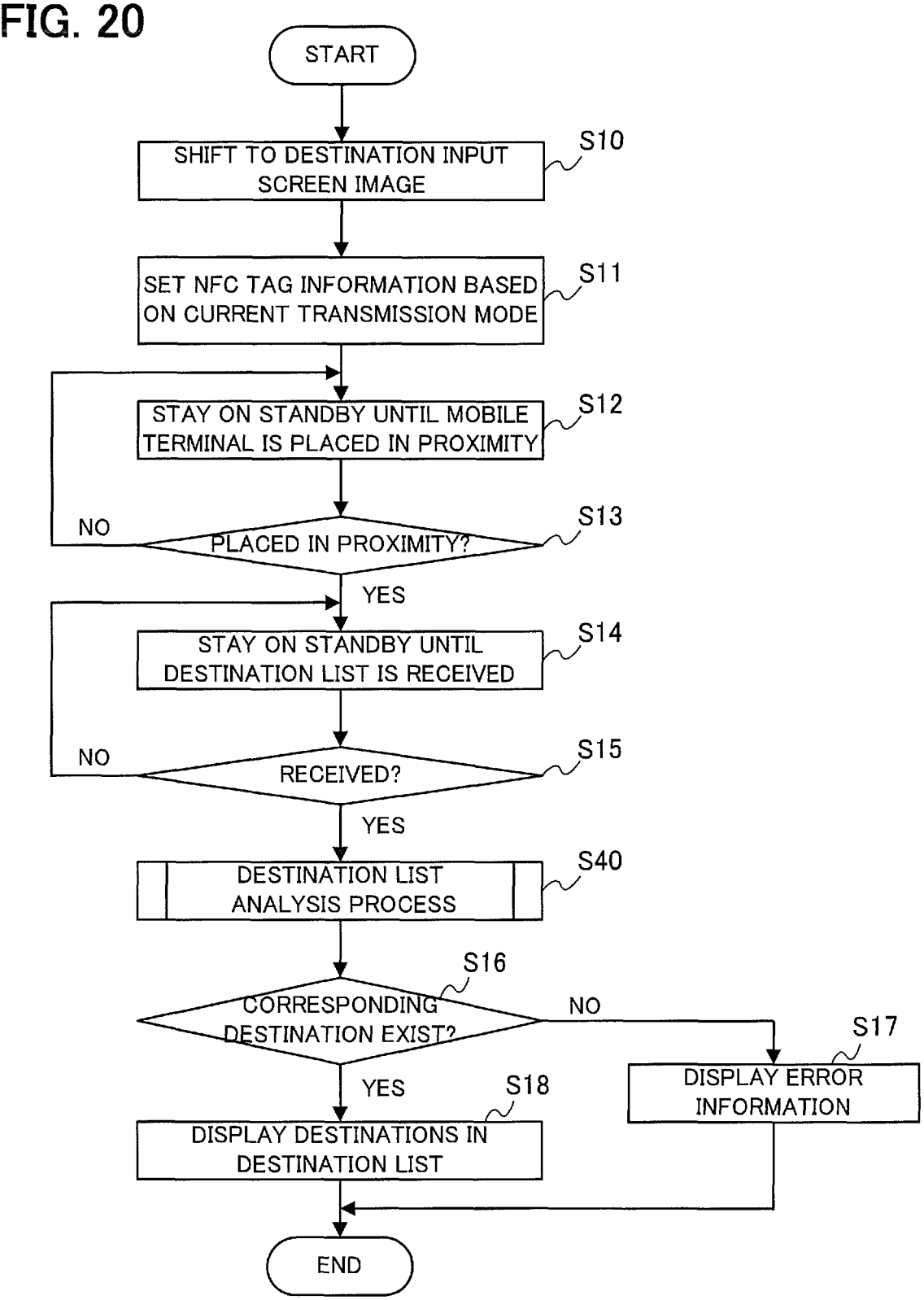
FIG. 20 is a flowchart showing a process in the image forming device in the third embodiment.

FIG. 20 is a flowchart showing a process in the image forming device 310 in the third embodiment.

Among the steps included in the flowchart shown in FIG. 20, the same steps as those in the flowchart shown in FIG. 7 are assigned the same reference characters as in FIG. 7 and thereby detailed explanation thereof is omitted.

The processing of the steps S10 to S15 in FIG. 20 is the same as the processing of the steps S10 to S15 in FIG. 7, However, the process in FIG. 20 proceeds to step S40 after the step S15.

In the step S40, the control section 336 performs an analysis process on the destination list from the mobile terminal 350. Details of this process will be described later.

After the step S40, the process proceeds to the step S16. The processing of the steps S16 to S18 in FIG. 20 is the same as the processing of the steps S16 to S18 in FIG. 7.

Figure 21:
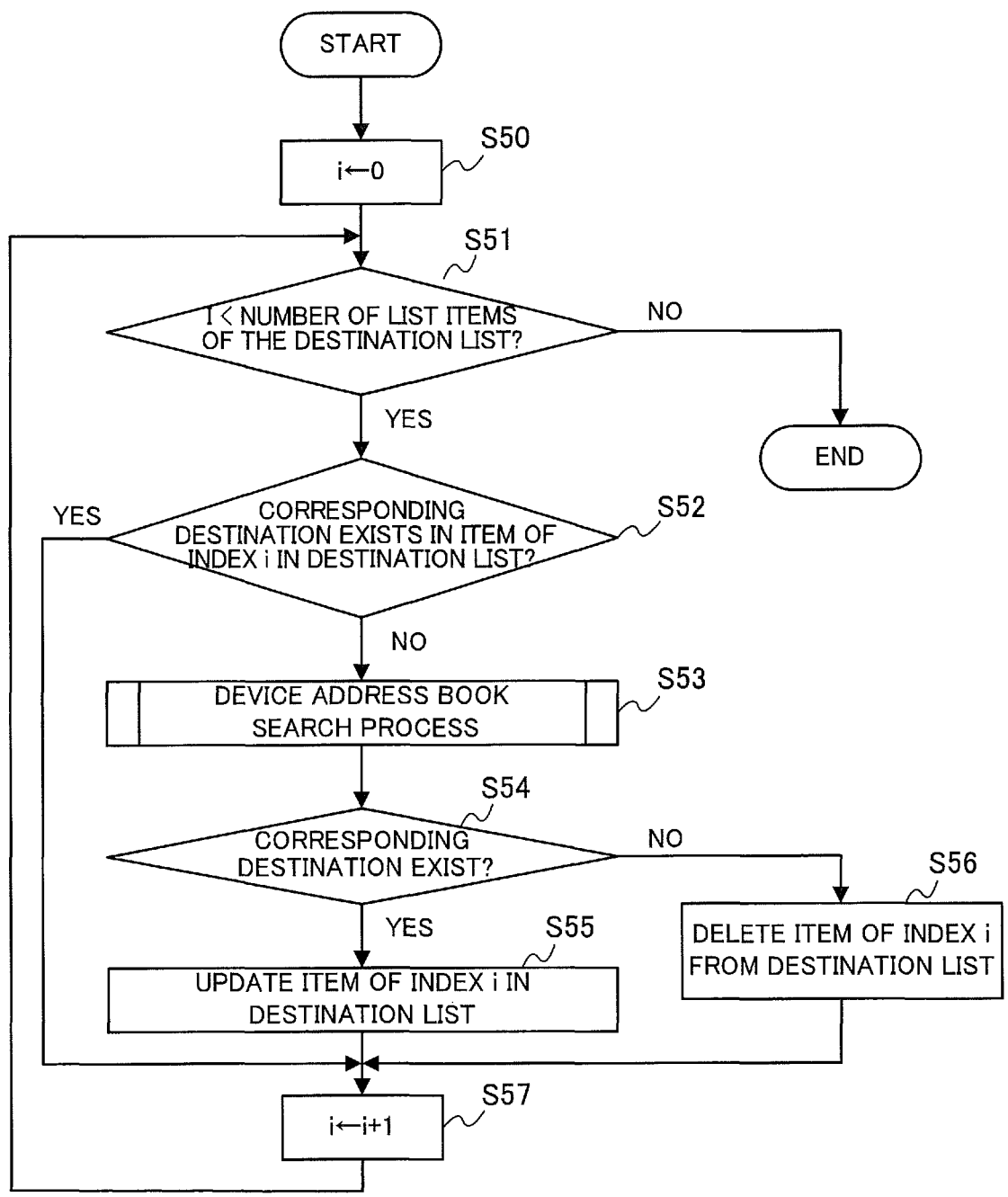
FIG. 21 is a flowchart showing a destination list analysis process in the third embodiment.

FIG. 21 is a flowchart showing the destination list analysis process.

Incidentally, it is assumed here that integer indexes i from 0 are sequentially assigned to the list items of the destination list. In other words, the indexes i are integers satisfying i≥0.

First, the control section 336 initializes the index i to "0" (S50).

Subsequently, the control section 336 determines whether or not the index i is smaller than the number of list items of the destination list (S51). By this step, the control section 336 determines whether or not the processing has been completed for all the contents of the destination list. If the index i is smaller than the number of list items of the destination list (YES in S51), the process proceeds to step S52. If the index i is equal to or more than the number of list items of the destination list (NO in S51), the process is ended.

In the step S52, the control section 336 determines whether or not a destination corresponding to the mode information 181b (email address in this example) exists in the destination list's list item corresponding to the index i. If a corresponding destination exists (YES in S52), the process proceeds to step S57. If no corresponding destination exists (NO in S52), the process proceeds to step S53.

In the step S53, the control section 336 makes the address book search section 337 execute an address book search process. In the address book search process, the address book search section 337 searches the device address book of the image forming device 310 for a destination corresponding to both the list item of the index i and the mode information 181b. Details of the processing in this step will be described later.

If such a destination is found (YES in S54), the process proceeds to step SSS. If no such destination is found (NO in S54), the process proceeds to step S56.

In the step S55, the control section 336 adds the destination found in the step S53 to the list item of the index i. Then, the process proceeds to step S57.

In contrast, in the step S56, the control section 336 deletes the list item of the index i from the destination list. Then, the process proceeds to the step S57.

In the step S57, the control section 336 increments the index i by 1. Then, the process returns to the step S51.

FIG. 22 is a flowchart showing the address book search process.

The address book search section 337 searches the device address book of the image forming device 310 for an item corresponding to the list item of the index i (S60). For example, the address book search section 337 searches the items of the device address book of the image forming device 310 by using a phone number included in the list item of the index i in the destination list as the key.

If a corresponding item exists (YES in S61), the process proceeds to step S62. If no corresponding item exists (NO in S61), the process proceeds to step S64.

In the step S62, the address book search section 337 determines whether or not a destination corresponding to the mode information 181b (email address in this example) exists in the item found in the step S60. If a corresponding destination exists (YES in S62), the process proceeds to step S63. If no corresponding destination exists (NO in S62), the process proceeds to step S64.

In the step S63, the address book search section 337 replies with the corresponding destination to the control section 336.

In contrast, in the step S64, the address book search section 337 replies with information indicating that no corresponding destination was found to the control section 336.

The processing in the third embodiment will be described below by using examples.

In a case where the terminal address book stored in the storage 153 of the mobile terminal 350 is the terminal address book table 182 shown in FIG. 12 and the history information stored in the storage 153 of the mobile terminal 350 is a history table 384 shown in FIG. 23, a destination list 383 shown in FIG. 24 is generated by the mobile terminal 350.

To the destination list 383, even the list items (object list items) 383a to 383c, in which no destination corresponding to the mode information 181b (email address in this example) has been registered in the terminal address book of the mobile terminal 350, have been added based on the history table 384.

In the image forming device 310 acquiring such a destination list 383, the control section 336 performs a process of adding the destination corresponding to the mode information 181b by using the device address book of the image forming device 310.

In this example, it is assumed that a device address book table 385 shown in FIG. 25 has been stored in the ROM 112 or the storage 114 of the image forming device 310 as the device address book of the image forming device 310.

For example, for the list item 383a of the destination list 383, the address book search section 337 searches the device address book table 385 shown in FIG. 25 for a corresponding item by using the phone number "0120-000-0002" as the key. In this example, the item 385b is found. Then, the address book search section 337 searches the item 385b for an email address as the destination corresponding to the mode information 181b, In this example, since the email address has been registered, the address book search section 337 replies with the item 385b, in which the email address "u0002@mail.com" has been registered, to the control section 336. The control section 336 adds the email address "u0002@mail.com" to the list item 383a of the destination list 383.

Subsequently, for the list item 383b of the destination list 383, the address book search section 337 searches the device address book table 385 shown in FIG. 25 for a corresponding item by using the phone number "0120-000-0004" as the key. In this example, since no corresponding item is found, the address book search section 337 replies with information indicating that no corresponding item is found to the control section 336. The control section 336 deletes the item 383b from the destination list 383.

For the list item 383c of the destination list 383, the address book search section 337 searches the device address book table 385 shown in FIG. 25 for a corresponding item by using the phone number "0120-111-1234" as the key. In this example, the item 385a is found. Then, the address book search section 337 searches the item 385a for an email address as the destination corresponding to the mode information 181b. In this example, since the email address has been registered, the address book search section 337 replies with the item 385a, in which the email address "u1234@mail.com" has been registered, to the control section 336. The control section 336 adds the email address "u1234@mail.com" and the name "User1234" to the list item 383c of the destination list 383.

As above, the control section 336 is capable of updating the destination list 383 from the mobile terminal 350 to the destination list 383# shown in FIG. 26 based on the device address book of the image forming device 110.

As described above, according to the third embodiment, the destination, list generated from the terminal address book and the telephone history records of the mobile terminal 350 is updated based on the device address book of the image forming device 110, and thus even a destination not registered in the mobile terminal 350 yet can be automatically inputted on the image forming device 310.

While the above embodiments have been described by using the email transmission function as the function demanding an input of a destination, the first to third embodiments are not limited to such a function. For example, the above described features can be employed for other functions demanding an input of a destination, such as the facsimile transmission function, a function of transfer to a personal folder, and a function of transmission to SNS (Social Networking Service).

Further, the destination list transmitted from the mobile terminal 150, 250 or 350 to the image forming device 110 or 310 may be configured to include other information such as photos and company names.

What is claimed is:

1. An information acquisition method by which a multifunction device acquires information from a mobile terminal in a communication system including the multifunction device and the mobile terminal capable of connecting to the multifunction device, the mobile terminal including a terminal address book including a plurality of items, the mobile terminal being able to register a plurality of destinations for each opposite party of communication by use of the mobile terminal to each of the plurality of items, the information acquisition method comprising:
   a step of selecting one function demanding an input of a destination from a plurality of functions which the multifunction device is capable of executing;
   a step in which the mobile terminal acquires, from the multifunction device, information indicating the one function selected in the step of selecting; and
   a step of transmitting the information from the mobile terminal to the multifunction device, the information indicating one or more destinations, the one or more destination being included in the plurality of destinations;
   wherein the information acquisition method further comprises a step of determining at least one destination corresponding to the one function between the step of selecting and the step of transmitting or after the step of transmitting.

2. The information acquisition method according to claim 1, wherein:
   the step of determining is executed by the mobile terminal between the step of selecting and the step of transmitting step,
   in the step of determining, the mobile terminal determines the at least one destination out of the plurality of destinations, and
   in the step of transmitting, the mobile terminal transmits a destination list as the information to the multifunction device, the destination list including at least one list item which includes the at least one destination as the one or more destinations.

3. The information acquisition method according to claim 2, wherein:
   the mobile terminal further includes history information indicating at least one opposite party of a phone call made by using the mobile terminal,
   the destination list includes the one list item for each opposite party of communication by use of the mobile terminal, and
   in the step of transmitting, the mobile terminal sorts the destination list according to the history information.

4. The information acquisition method according to claim 2, wherein when the mobile terminal is in the middle of a phone call in the determining step, if an item corresponding to the opposite party in the middle of the phone call among the plurality of items includes a first destination as a destination corresponding to the one function, the mobile terminal determines the first destination as the at least one destination.

5. The information acquisition method according to claim 2, wherein:
   the mobile terminal further includes history information indicating at least one opposite party of a phone call made by using the mobile terminal,
   in the determining step, if at least one item corresponding to the at least one opposite party among the plurality of items includes a second destination as a destination corresponding to the one function, the mobile terminal determines the second destination as the at least one destination.

6. The information acquisition method according to claim 5, wherein in the step of determining, the mobile terminal collects items corresponding to opposite parties of phone calls made in a predetermined period among the at least one opposite party and determines whether or not each of the collected items includes the second destination, the collected items being included in the plurality of items.

7. The information acquisition method according to claim 5, wherein in the step of determining, the mobile terminal collects items corresponding to a predetermined number of opposite parties among the at least one opposite party and determines whether or not each of the collected items includes the second destination, the collected items being included in the plurality of items.

8. The information acquisition method according to claim 1, wherein:
   the step of determining is executed by the multifunction device after the step of transmitting, and
   In the step of determining, the multifunction device determines the at least one destination out of the one or more destinations.

9. The information acquisition method according to claim 1, further comprising:
    a step of the multifunction device displaying a first destination input screen image for inputting a transmission destination as a destination of transmitting image data in the one function, and
    a step the multifunction device displaying a second destination input screen image on which the transmission destination can be inputted by selecting the at least one destination.

10. An information acquisition method by which a multifunction device acquires information from a mobile terminal in a communication system including the multifunction device and the mobile terminal capable of connecting to the multifunction device, the mobile terminal including a terminal address book including a plurality of items, the mobile terminal being able to register identification information and a plurality of destinations for each opposite party of communication by use of the mobile terminal to each of the plurality of items, the multifunction device storing a device address book including a plurality of records, the multifunction device being able to register identification information and a plurality of destinations for each opposite party of communication by use of the multifunction device to each of the plurality of records, the information acquisition method comprising:
    a step of selecting one function demanding an input of a destination from a plurality of functions which the multifunction device is capable of executing;
    a step of transmitting a destination list as the information from the mobile terminal to the multifunction device, the destination list including at least one list item, the at least one list item including identification information registered in an item corresponding to an opposite party in the middle of a phone call among the plurality of items; and
    a step of the multifunction device extracting, from one of the plurality of records included in the device address book stored in the multifunction device and corresponding to the at least one list item, a destination corresponding to the one function, and the multifunction device adding the extracted destination to the at least one list item.

11. An information acquisition method by which a multifunction device acquires information from a mobile terminal in a communication system including the multifunction device and the mobile terminal capable of connecting to the multifunction device, the mobile terminal including a terminal address book including a plurality of items and telephone history information indicating at least one opposite party of a phone call previously made by using the mobile terminal, the mobile terminal being able to register identification information and a plurality of destinations for each opposite party of communication by use of the mobile terminal to each of the plurality of items, the multifunction device including a device address book including a plurality of records, the multifunction device being able to register identification information and a plurality of destinations for each opposite party of communication by use of the multifunction device to each of the plurality of records, the information acquisition method comprising:
    a step of selecting one function demanding an input of a destination from a plurality of functions which the multifunction device is capable of executing;
    a step of transmitting a destination list as the information from the mobile terminal to the multifunction device, the destination list including at least one list item, the at least one list item including identification information registered in an item corresponding to at least one opposite party included in the telephone history information among the plurality of items; and
    a step of the multifunction device extracting a destination corresponding to the one function from a record corresponding to the at least one list item among the plurality of records included in the device address book, and the multifunction device adding the extracted destination to the at least one list item.

12. The information acquisition method according to claim 10, further comprising:
    a step of the multifunction device displaying a first destination input screen image for inputting a transmission destination as a destination of transmitting image data in the one function, and
    a step of the multifunction device displaying a second destination input screen image on which the transmission destination can be inputted by selecting the extracted destination.

13. A communication system comprising a multifunction device and a mobile terminal, wherein:
    the multifunction device includes:
    an NFC tag compatible with the NFC (Near Field Communication) standard;
    a device NFC unit that performs near field radio communication compatible with the NFC standard;
    a device communication section for connecting to a network;
    a device display section that displays a first destination input screen image for inputting a transmission destination as a destination of transmitting image data in the network according to a selected function;
    a device input section that receives an input of the transmission destination; and
    a device control section that stores information indicating the selected function and application information in the NFC tag when the device display section displays the first destination input screen image, to make the mobile terminal activate a predetermined application,
    the mobile terminal includes:
    a terminal storage section storing a terminal address book including a plurality of items, the mobile terminal being able to register a plurality of destinations for each opposite party of communication by use of the mobile terminal to each of the items;
    a terminal NFC unit that performs near field radio communication compatible with the NFC standard; and
    a terminal control section that acquires the information indicating the selected function and the application information by the terminal NFC unit communicating with the NFC tag while the first destination input screen image is displayed on the device display section, activates the predetermined application according to the acquired application information, generates a destination list which includes at least one list item including at least one destination corresponding to the selected function and registered in at least one item among the plurality of items, and makes the terminal NFC unit transmit the generated destination list to the device NFC unit, and
    the device control section acquires the destination list via the device NFC unit and makes the device display section display a second destination input screen image on which the transmission destination can be inputted by selecting the at least one destination included in the destination list.

14. A non-transitory computer-readable medium storing a program causes a computer including a terminal NFC unit performing near field radio communication compatible with the NFC (Near Field Communication) standard to perform:
- storing a terminal address book including a plurality of items, the computer being able to register a plurality of destinations for each opposite party of communication by use of the computer to each of the items;
- acquiring, via the terminal NFC unit from a multifunction device displaying a first destination input screen image for inputting a transmission destination as a destination of transmitting image data in a network according to a selected function, application information to making the computer activate a predetermined application and information indicating the selected function;
- activating the predetermined application according to the acquired application information;
- generating a destination list including at least one list item, the at least one list item including at least one destination corresponding to the selected function and registered in at least one item among the plurality of items; and
- making the terminal NFC unit transmit the generated destination list to the multifunction device.

* * * * *